United States Patent
Suzuki et al.

(10) Patent No.: US 7,110,201 B2
(45) Date of Patent: Sep. 19, 2006

(54) MASTER MEDIUM FOR MAGNETIC TRANSFER AND MAGNETIC DISK AND MAGNETIC DISK DRIVE

(75) Inventors: Hiroyuki Suzuki, Kawasaki (JP); Hitoshi Komoriya, Kawasaki (JP); Yutaka Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 10/870,823

(22) Filed: Jun. 17, 2004

(65) Prior Publication Data
US 2005/0134987 A1    Jun. 23, 2005

(30) Foreign Application Priority Data
Dec. 17, 2003    (JP)    ............... 2003-419200

(51) Int. Cl.
G11B 5/09    (2006.01)
G11B 5/86    (2006.01)

(52) U.S. Cl. ............... 360/48; 360/31; 360/16; 360/17

(58) Field of Classification Search ............. None
See application file for complete search history.

(56) References Cited

U.S. PATENT DOCUMENTS

| | | | |
|---|---|---|---|
| 6,324,032 B1* | 11/2001 | Ohtsuka et al. ............ | 360/131 |
| 6,347,016 B1* | 2/2002 | Ishida et al. ............ | 360/17 |
| 6,529,341 B1* | 3/2003 | Ishida et al. ............ | 360/48 |
| 6,704,156 B1* | 3/2004 | Baker et al. ............ | 360/75 |
| 6,738,205 B1* | 5/2004 | Moran et al. ............ | 360/17 |
| 6,754,016 B1* | 6/2004 | Messner et al. ............ | 360/48 |
| 6,950,254 B1* | 9/2005 | Suzuki et al. ............ | 360/17 |
| 6,961,196 B1* | 11/2005 | Ishida et al. ............ | 360/16 |
| 6,961,203 B1* | 11/2005 | Baker ............ | 360/77.08 |
| 6,977,785 B1* | 12/2005 | Nakamura et al. ............ | 360/17 |
| 7,012,775 B1* | 3/2006 | Suzuki et al. ............ | 360/75 |
| 2002/0159173 A1* | 10/2002 | Ishida et al. ............ | 360/17 |
| 2003/0223147 A1* | 12/2003 | Nishida et al. ............ | 360/78.04 |
| 2006/0001999 A1* | 1/2006 | Ehrlich ............ | 360/75 |

FOREIGN PATENT DOCUMENTS

JP    2001-312819    11/2001

* cited by examiner

Primary Examiner—Wayne Young
Assistant Examiner—Dismery Mercedes
(74) Attorney, Agent, or Firm—Greer, Burns & Crain, Ltd.

(57) ABSTRACT

A master medium is utilized in a magnetic transfer apparatus. The master medium is superposed on a blank magnetic medium. A predetermined magnetic field is then applied to the master medium. The magnetic flux leaks from the master medium between adjacent magnetic pieces on the master medium. The leaked magnetic flux acts on the magnetic medium. The magnetization is accordingly established on the surface of the magnetic medium. Here, spaces can be reduced between the adjacent magnetic pieces on the master medium. Magnetization of a sufficient intensity can reliably be established on the magnetic medium.

5 Claims, 15 Drawing Sheets

MASTER MEDIUM FOR MAGNETIC TRANSFER AND MAGNETIC DISK AND MAGNETIC DISK DRIVE

BACKGROUND OF THE INVENTION

1. Field of the Invention

The present invention relates to a magnetic transfer apparatus designed to establish a servo region on a magnetic recording medium such as a magnetic disk, for example. The servo region serves to define recording tracks on the magnetic recording medium in a magnetic storage device such as a hard disk drive (HDD), for example.

2. Description of the Prior Art

A preamble region, a servo mark region and a servo data region are in this sequence defined over a servo region on a magnetic recording disk. The preamble region includes alternate positive and negative magnetic poles equally spaced in the circumferential direction. The servo data region includes magnetic poles arranged in accordance with a predetermined pattern varying in the radial direction. A synchronization signal can be obtained in the HDD based on the magnetic information derived from the preamble region. A head is positioned right above a recording track at a higher accuracy based on the magnetic information derived from the servo data region.

When the magnetic poles are to be established on a magnetic recording disk, a blank magnetic disk is set in a magnetic transfer apparatus. A master medium is superposed on the blank magnetic disk in the magnetic transfer apparatus. Magnetic pieces and non-magnetic pieces are alternately arranged in the master medium in accordance with the arrangement of the magnetic poles. When a magnetic field is applied to the master medium in a set direction, leakage of magnetic flux is induced between the adjacent magnetic pieces. This leaked magnetic flux serves to establish magnetization in the magnetic disk.

No magnetic pieces are formed in the master medium at a position corresponding to the servo mark region of the magnetic recording disk. A larger non-magnetic space is defined between the magnetic pieces corresponding to the preamble region and the magnetic pieces corresponding to the servo data region. Leakage of a weak magnetic field is thus induced between the magnetic pieces across the non-magnetic space. The leaked weak magnetic field acts on the servo mark region on the magnetic disk, so that the weak magnetic pole will be established in the servo mark region adjacent the servo data region. Such a weak magnetic pole has a polarity different from that of the first magnetic pole of the servo data region and the intensity smaller than that of the first magnetic pole. This weak magnetic pole is often mistaken for the first magnetic pole of the servo data region. This mistake will disturb the servo control of the head. The head cannot keep following recording tracks on the magnetic disk.

SUMMARY OF THE INVENTION

It is accordingly an object of the present invention to provide a master medium contributing to a reliable elimination of an additional weak magnetic pole during establishment of a servo region on a magnetic recording medium. It is also an object of the present invention to provide a magnetic disk drive reliably enabling a head to follow a recording track at a higher accuracy irrespective of presence of an additional weak magnetic pole.

According to a first aspect of the present invention, there is provided a master medium for magnetic transfer, comprising: first magnetic pieces extending in the radial direction at positions equally spaced in the circumferential direction; a second magnetic piece located adjacent the first magnetic pieces in the circumferential direction, said second magnetic piece being arranged in accordance with a predetermined pattern; and a third magnetic piece located adjacent the second magnetic piece in the circumferential direction, said third magnetic piece being arranged in accordance with a pattern different from the predetermined pattern.

The master medium is utilized in a magnetic transfer apparatus. The master medium is superposed on the upper surface of a magnetic medium such as a blank magnetic disk in the magnetic transfer apparatus. A predetermined magnetic field is then applied to the master medium. The magnetic field induces the flow of magnetic flux. The magnetic flux penetrates through the magnetic pieces. The magnetic flux leaks from the master medium between the adjacent magnetic pieces. The magnetic flux thus induces leakage of the magnetic field from the master medium. The leaked magnetic field acts on the surface of the magnetic medium. The magnetization is accordingly established on the surface of the magnetic medium.

Here, spaces can be reduced between the adjacent magnetic pieces on the master medium. The magnetic flux acting on the magnetic pieces thus enables generation of the leaked magnetic field of a sufficient intensity. Magnetization of a sufficient intensity can reliably be established on the magnetic medium. This serves to eliminate establishment of an additional weak magnetic pole on the magnetic medium. On the other hand, a conventional master medium includes the aforementioned first magnetic pieces and second magnetic pieces spaced from the first magnetic pieces in the circumferential direction. The second magnetic pieces are arranged in accordance with a predetermined pattern. A larger space must be defined between the first and second magnetic pieces. The magnetic pieces serve to induce a weak leakage of the magnetic field across the larger space. Such a weak magnetic field inevitably forms a magnetic pole, weaker than the normal magnetic poles, on the magnetic medium.

According to a second aspect of the present invention, there is provided a magnetic disk comprising: a data region; a servo region located adjacent the data region in the circumferential direction; a preamble region extending in the radial direction within the servo region, said preamble region designed to generate a magnetic field in accordance with a predetermined iterant pattern in the circumferential direction; a servo data region extending in the circumferential direction within the servo region, said servo data region designed to generate a magnetic field in accordance with a predetermined pattern varying in the radial direction; and a servo mark region located between the preamble and servo data regions within the servo region, said servo mark region designed to generate a magnetic field in accordance with a pattern different from the predetermined iterant pattern and the predetermined pattern.

The leaked magnetic field from the first magnetic pieces in the aforementioned master medium serves to establish the preamble region on the magnetic medium. The leaked magnetic field from the second magnetic pieces likewise serves to establish the servo mark region on the magnetic medium. The leaked magnetic field from the third magnetic pieces serves to establish the servo data region on the magnetic medium. Since the second magnetic pieces are located within a region corresponding to the servo mark region, spaces can be reduced between the adjacent magnetic pieces on the master medium. In particular, smaller spaces can be set between the adjacent magnetic pieces as compared with the case where the master medium fails to have the second magnetic pieces within a region corresponding to the servo mark region. The magnetic flux acting on the magnetic pieces thus enables generation of the leaked magnetic field of a sufficient intensity. Magnetization of a sufficient intensity can reliably be established on the magnetic medium. This serves to eliminate establishment of an additional weak magnetic pole on the magnetic medium. On the other hand, no magnetic pieces are at all arranged within a region corresponding to the servo mark region in a conventional master medium. A larger space should be defined between the adjacent magnetic pieces. The magnetic pieces serve to induce a weak leakage of the magnetic field across the larger space. Such a weak magnetic field inevitably forms a magnetic pole, weaker than the normal magnetic poles, at a position adjacent the servo data region on the magnetic medium.

The magnetic disk of the type may be incorporated within a magnetic disk drive or storage device such as a hard disk drive (HDD). In this case, the magnetic disk drive may include an enclosure; the magnetic disk airtightly incorporated within the enclosure; a head slider airtightly incorporated within the enclosure, said head slider being opposed to the magnetic disk; and an actuator supported on a support shaft for rotation, said actuator carrying the head slider at the tip end. The magnetic disk drive enables elimination of a bore receiving an insert pin for driving the actuator.

In general, a so-called servo track writer is designed to establish a servo pattern in a complete HDD. A read/write electromagnetic transducer on a head slider in the HDD is utilized to write the servo pattern onto magnetic disks. The head slider must accurately be positioned relative to the magnetic disks in the HDD. The servo track writer utilizes an insert pin to position the head slider. The insert pin is inserted into the enclosure for driving a head actuator carrying the head slider. On the other hand, the magnetic transfer apparatus as mentioned above is designed to establish a servo pattern on a bare magnetic disk before the assembling of a HDD. The magnetic disk with the established servo pattern can be incorporated within a HDD. The read/write electromagnetic transducer is allowed to follow a recording track defined by the previously established servo pattern on the magnetic disk. The insert pin is not required to position the head slider in the HDD. Accordingly, the bore, for receiving the inert pin, can be eliminated from the enclosure of the HDD.

The elimination of the bore as mentioned above enables a simplified structure of the enclosure. The simplified structure leads to a reduced cost in the production process. In addition, the elimination of the bore serves to enhance the isolation of the inner space from the exterior space. In general, a cover seal or thin sheet is adhered to the surface of the enclosure so as to seal the bore. A cover seal can be eliminated in the HDD. A further reduction in the cost can be achieved.

The aforementioned magnetic transfer apparatus enables a magnetized region that is defined and contoured with a straight line inclined from a radius in the servo data region. A head slider can be positioned at a higher accuracy based on the reproduction signal derived from such a servo data region. On the other hand, a read/write electromagnetic transducer on a head slider is utilized to establish a servo pattern in a servo track writer, so that the established servo pattern cannot be contoured with a straight line inclined from a radius.

According to a third aspect of the present invention, there is provided a magnetic disk drive comprising: an enclosure; a magnetic disk airtightly incorporated within the enclosure; a head slider opposing a read element to the magnetic disk; an actuator supported on a support shaft for rotation, said actuator carrying the head slider at the tip end; and a controller circuit designed to control the rotation of the actuator based on a signal supplied from the read element. The magnetic disk is provided with: a data region; a servo region located adjacent the data region in the circumferential direction; a preamble region extending in the radial direction within the servo region, said preamble region including alternate positive and negative magnetic poles in accordance with a predetermined iterant pattern in the circumferential direction; a servo data region extending in the radial direction within the servo region, said servo data region including alternate positive and negative magnetic poles in accordance with a predetermined iterant pattern in the circumferential direction at least at positions closest to the preamble region; and a servo mark region located between the preamble and servo data regions within the servo region, said servo mark region including a magnetic pole located adjacent the servo data region, said magnetic pole having a polarity different from that of the first magnetic pole of the servo data region and an intensity smaller than that of the first magnetic pole. The controller circuit is designed to control the rotation of the actuator based on a magnetic pole, in the servo data region, having a polarity identical to that of the first magnetic pole.

The controller circuit can be restrained from utilizing magnetic poles having a polarity different from that of the first magnetic pole of the servo data region when controlling the rotation of the actuator. No effects act on the operation of the controller circuit based on the magnetic pole having a polarity different from that of the first magnetic pole of the servo data region and an intensity smaller than that of the first magnetic pole. The servo mark region can correctly be detected irrespective of the presence of such a weak magnetic pole. In particular, the first magnetic pole of the servo data region can be detected at the correct timing. The rotation of the actuator can accurately be controlled irrespective of the presence of an additional weak magnetic pole. The read element on the head slider is allowed to accurately follow the recording tracks on the magnetic disk. The magnetic disk drive of this type enables a magnetized region that is defined and contoured with a straight line inclined from a radius in the servo data region in the same manner as described above. Moreover, the bore, for receiving the inert pin, can be eliminated from the enclosure of the magnetic disk drive in the same manner as described above.

Additionally, a magnetic disk may be provided with: a data region; a servo region located adjacent the data region in the circumferential direction; a preamble region extending in the radial direction within the servo region, said preamble region including alternate positive and negative magnetic poles in accordance with a predetermined iterant pattern in the circumferential direction; a servo data region extending in the circumferential direction within the servo region, said servo data region designed to generate a magnetic field in accordance with a predetermined pattern varying in the radial direction; and a servo mark region located between the preamble and servo data regions within the servo region, said servo mark region including a magnetic pole located adjacent the preamble region, said magnetic pole having a polarity different from that of the last magnetic pole of the preamble region and an intensity smaller than that of the last magnetic pole. In this case, the controller circuit may be designed to control the rotation of the actuator based on a magnetic pole, in the servo data region, having a polarity different from that of the last magnetic pole.

In general, in the case where a magnetic pole is formed in the servo mark region at a position adjacent the servo data region, thereby having a polarity different from that of the first magnetic pole of the servo data region and an intensity smaller than that of the first magnetic pole, a magnetic pole is formed in the servo mark region at a position adjacent the preamble region, thereby having a polarity different from that of the last magnetic pole of the preamble region and an intensity smaller than that of the last magnetic pole. Since the last magnetic pole of the preamble region has a polarity different from that of the first magnetic pole of the servo data region, the control on the rotation of the actuator based on the magnetic poles having a polarity different from the last magnetic pole of the preamble region serves to eliminate utilization of magnetic poles having a polarity different from that of the first magnetic pole of the servo data region in the same manner as described above. No effects act on the operation of the controller circuit based on the magnetic pole having a polarity different from that of the first magnetic pole of the servo data region and an intensity smaller than that of the first magnetic pole. In this manner, the rotation of the actuator can accurately be controlled irrespective of the presence of an additional weak magnetic pole. Moreover, it is not required to utilize the magnetic pole located adjacent the preamble region within the servo mark region so as to achieve the operation of the controller circuit in the magnetic disk drive. Accordingly, the control on the rotation of the actuator cannot be disturbed even if a magnetic pole is formed in the servo mark region at a position adjacent the preamble region so as to have a polarity different from that of the last magnetic pole of the preamble region and an intensity smaller than that of the last magnetic pole.

According to a fourth aspect of the present invention, there is provided a magnetic disk drive comprising: an enclosure; a magnetic disk airtightly incorporated within the enclosure; a head slider opposing a read element to the magnetic disk; an actuator supported on a support shaft for rotation, said actuator carrying the head slider at the tip end; and a controller circuit designed to control the rotation of the actuator based on a signal supplied from the read element. Here, the magnetic disk is provided with: a data region; a servo region located adjacent the data region in the circumferential direction; a preamble region extending in the radial direction within the servo region, said preamble region including alternate positive and negative magnetic poles equally spaced by a predetermined uniform space in the circumferential direction; a servo data region extending in the radial direction within the servo region, said servo data region including a referential magnetic pole spaced in the circumferential direction from a magnetic pole of the preamble region by a space N times as large as the predetermined uniform space, in which N is a natural number; and a servo mark region located between the preamble and servo data regions within the servo region, said servo mark region including a magnetic pole located adjacent the servo data region, said magnetic pole having a polarity different from that of the referential magnetic pole of the servo data region and an intensity smaller than that of the referential magnetic pole. The controller circuit is designed to detect a signal out of the servo data region at a predetermined timing established in accordance with the alternate positive and negative magnetic poles.

The magnetic disk drive of this kind allows maximum and minimum peaks to appear in the reproduction signal at equal intervals based on the magnetic poles in the preamble and/or servo data regions. On the other hand, large and small peaks appear off the phase of the maximum and minimum peaks in the reproduction signal based on the magnetic poles within the servo mark region. Specifically, the appearance of the large and small peaks fails to synchronize with the appearance of the maximum and minimum peaks. The large and small peaks need not be utilized in the controller circuit in controlling the rotation of the actuator. No effects act on the operation of the controller circuit based on the magnetic pole within the servo mark region. The servo mark region can accurately be detected irrespective of the presence of such a weak magnetic pole within the servo mark region. In particular, the first magnetic pole of the servo data region can be detected at the correct timing irrespective of the presence of the weak magnetic pole. An accurate tracking servo control can be achieved irrespective of the presence of an additional weak magnetic pole. The read element on the flying head slider is allowed to accurately follow the recording tracks on the magnetic disk. The magnetic disk drive of this type enables a magnetized region that is defined and contoured with a straight line inclined from a radius in the servo data region in the same manner as described above. Moreover, the bore, for receiving the inert pin, can be eliminated from the enclosure of the magnetic disk drive in the same manner as described above.

Additionally, a magnetic disk may be provided with: a data region; a servo region located adjacent the data region in the circumferential direction; a preamble region extending in the radial direction within the servo region, said preamble region including alternate positive and negative magnetic poles equally spaced by a predetermined uniform space in the circumferential direction; a servo data region extending in the radial direction within the servo region, said servo data region including a reference magnetic pole spaced in the circumferential direction from a magnetic pole of the preamble region by a space N times as large as the predetermined uniform space, in which N is a natural number; and a servo mark region located between the preamble and servo data regions within the servo region, said servo mark region including a magnetic pole located adjacent the preamble region, said magnetic pole having a polarity different from that of a last magnetic pole of the preamble region and an intensity smaller than that of the last magnetic pole. In this case, the controller circuit may be designed to detect a signal out of the servo data region at a predetermined timing established in accordance with the alternate positive and negative magnetic poles.

In general, in the case where a magnetic pole is formed in the servo mark region at a position adjacent the servo data region, thereby having a polarity different from that of the referential magnetic pole of the servo data region and an intensity smaller than that of the referential magnetic pole, a magnetic pole is formed in the servo mark region at a position adjacent the preamble region, thereby having a polarity different from that of the last magnetic pole of the preamble region and an intensity smaller than that of the last magnetic pole. The large or small peak appears in the reproduction signal based on such a magnetic pole off the phase of the maximum or minimum peaks. Specifically, the appearance of the large or small peak fails to synchronize with the appearance of the maximum and minimum peaks. The large or small peak needs not be utilized in the controller circuit in controlling the rotation of the actuator. The servo mark region can accurately be detected irrespective of the presence of such a weak magnetic pole within the servo mark region. In particular, the first magnetic pole of the servo data region can be detected at the correct timing irrespective of the presence of the weak magnetic pole. An accurate tracking servo control can be achieved irrespective of the presence of an additional weak magnetic pole. The read element on the flying head slider is allowed to accurately follow the recording tracks on the magnetic disk.

According to a fifth aspect of the present invention, there is provided a magnetic disk comprising: a data region; a servo region located adjacent the data region in a circumferential direction; a referential information region dividing magnetization in the servo region by radii; a first positional information region dividing magnetization in the servo region by first referential lines inclined in a first circumferential direction from a datum radius; and a second positional information region dividing magnetization in the servo region by second referential lines inclined in a second circumferential direction, opposite to the first circumferential direction, from the datum radius. The magnetic disk may further comprise: a preamble region extending in the radial direction within the servo region, said preamble region including alternate positive and negative magnetic poles equally spaced in the circumferential direction; and a servo mark region located between the preamble and referential information regions within the servo region, said servo mark region including a magnetic pole located adjacent the referential information region, said magnetic pole having a polarity different from that of the first magnetic pole of the referential information region and an intensity smaller than that of the first magnetic pole. Otherwise, the magnetic disk may further comprise: a preamble region extending in the radial direction within the servo region, said preamble region including alternate positive and negative magnetic poles equally spaced in the circumferential direction; and a servo mark region located between the preamble and referential information regions within the servo region, said servo mark region including a magnetic pole located adjacent the preamble region, said magnetic pole having a polarity different from that of the last magnetic pole of the preamble region and an intensity smaller than that of the last magnetic pole.

A constant clearance can be maintained on a recording track on the magnetic disk between a predetermined one of the first referential lines and a predetermined one of the second referential lines. Accordingly, the measurement of the clearance serves to determine the position of the recording track at a higher accuracy. In this measurement, distances are measured between the radius in the referential information region and the first referential line in the first positional information region, and between the radius in the referential information region and the second referential line in the second positional information region. The difference between the distances corresponds to the distance between the first and second referential lines. It is possible to completely eliminate the effect of the weak magnetic pole formed within the servo data region in determining the position of the recording track.

The magnetic disk of the type may be incorporated within a magnetic disk drive or storage device such as a hard disk drive. In this case, the magnetic disk drive may include an enclosure; the magnetic disk airtightly incorporated within the enclosure; a head slider airtightly incorporated within the enclosure, said head slider being opposed to the magnetic disk; an actuator supported on a support shaft for rotation, said actuator carrying the head slider at the tip end; and a controller circuit designed to control the rotation of the actuator based on a signal supplied from the read element. The controller circuit may utilize the difference between the phase derived from the first positional information region and the phase derived from the second positional information region so as to achieve the set control. The magnetic disk drive allows elimination of the effect of the weak magnetic pole formed within the servo data region in controlling the rotation of the actuator. The rotation of the actuator can accurately be controlled irrespective of the presence of an additional weak magnetic pole. The read element on the head slider is allowed to accurately follow the recording tracks on the magnetic disk. The magnetic disk drive of this type enables a magnetized region that is defined and contoured with a straight line inclined from a radius in the servo data region in the same manner as described above. Moreover, the bore, for receiving the inert pin, can be eliminated from the enclosure of the magnetic disk drive in the same manner as described above.

A magnetic transfer apparatus may be utilized to make the aforementioned magnetic disk. A master medium is usually incorporated in such a magnetic transfer apparatus. The master medium may comprise: first magnetic pieces extending in the radial direction at positions equally spaced in the circumferential direction; second magnetic pieces extending along a first referential line inclined in a first circumferential direction from a datum radius, said second magnetic pieces arranged at positions equally spaced in the circumferential direction; and third magnetic pieces extending along a second referential line inclined in a second circumferential direction opposite to the first circumferential direction from the datum radius, said third magnetic pieces arranged at positions equally spaced in the circumferential direction. The leaked magnetic field from the first magnetic pieces serves to establish the referential information region. Likewise, the leaked magnetic field from the second magnetic pieces serves to establish the first positional information region. In the same manner, the leaked magnetic field from the third magnetic pieces serves to establish the second positional information region.

According to a sixth aspect of the present invention, there is provided a master medium for magnetic transfer, comprising: first magnetic pieces extending in the radial direction at positions equally spaced in the circumferential direction by a uniform space; a second magnetic piece extending in the radial direction at a position spaced from the first magnetic pieces in the circumferential direction by the uniform space, said second magnetic piece having a width equal to N times as large as the uniform space, in which N is a natural number; and at least a third magnetic piece extending in the radial direction at a position spaced from the second magnetic piece in the circumferential direction by the uniform space.

Spaces between the adjacent magnetic pieces are unified on the master medium. A reduced uniform space can be established between any adjacent pairs of the magnetic pieces, so that the leaked magnetic field is allowed to have a sufficient intensity or strength. Magnetization of a sufficient intensity can reliably be established on the magnetic disk. This serves to eliminate establishment of an additional weak magnetic pole on the magnetic disk. The master medium may further comprise a fourth magnetic piece located adjacent the third magnetic piece in the circumferential direction. The fourth magnetic piece may be contoured with a straight line inclined from a radius.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
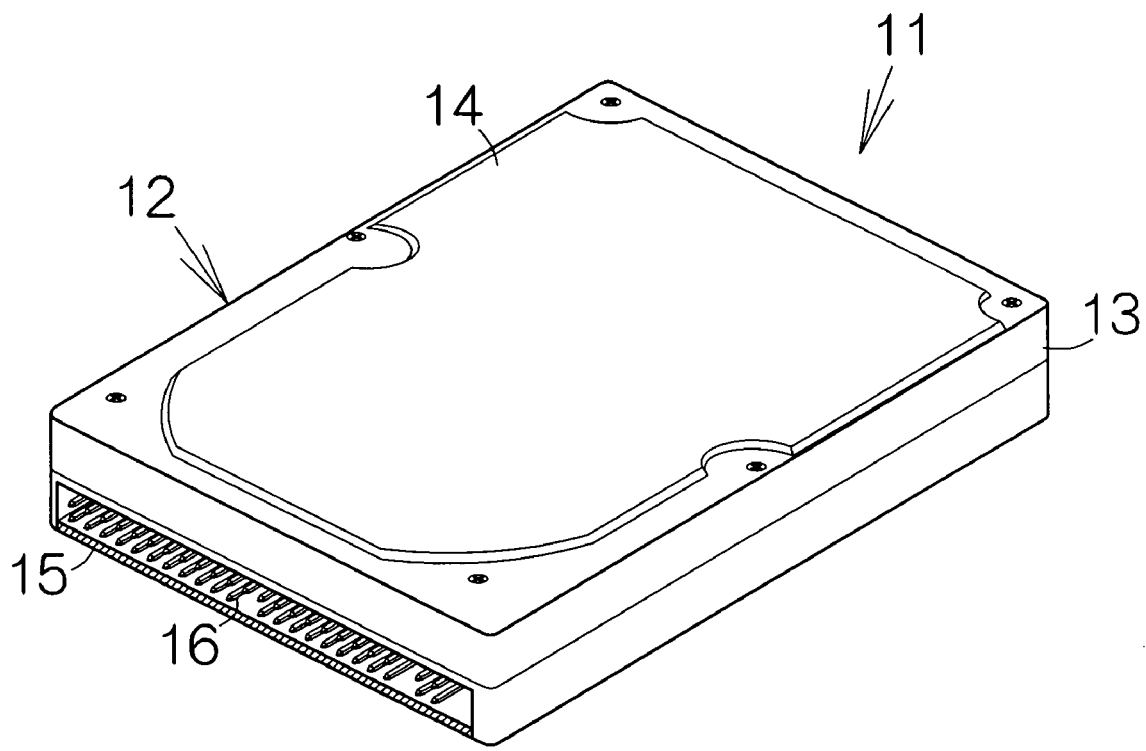
FIG. 1 is a perspective view schematically illustrating the outline of a hard disk drive (HDD) as a specific example of a magnetic medium drive according to a first embodiment of the present invention.

FIG. 1 schematically illustrates the outline of a hard disk drive (HDD) 11 as an example of a magnetic recording drive or storage device according to a first embodiment of the present invention. The HDD 11 includes a box-shaped enclosure 12. The enclosure 12 includes an enclosure body 13 defining an inner space of a flat parallelepiped, for example. The enclosure body 13 may be made of a metallic material such as aluminum, for example. Molding process may be employed to form the enclosure body 13. A cover 14 is coupled to the enclosure body 13, so that the inner space of the enclosure body 13 is airtightly isolated from the exterior space. The cover 14 may be formed of a single plate material based on pressing process, for example. The plate material may be a layered material having a damping property to vibration.

The HDD 11 allows elimination of a bore, receiving an insert pin, from the cover 14 of the enclosure 12. The structure of the cover 14 is simplified. The simplified structure leads to a reduced cost in the production process. In addition, the elimination of the bore serves to enhance the isolation of the inner space from the exterior space. In general, a cover seal or thin sheet is adhered to the surface of the cover 14 so as to seal the bore. A cover seal can be eliminated in the HDD 11. The insert pin is utilized to write servo patterns on a magnetic recording disk as described later in detail.

A printed circuit board 15 is attached to the outside of the enclosure body 13. LSI (Large-Scale Integrated circuit) chips, not shown, such as a CPU (Central Processing Unit) and a hard disk controller, as well as a connector 16 are mounted on the printed circuit board 15. The CPU and hard disk controller are utilized to control the operation of the HDD 11. The connector 16 is designed to receive cables, not shown, from a main board of a host computer, for example, for power supply and transmission of control signals. The CPU and the hard disk controller are allowed to use the electric power from the cable for power supply.

Figure 2:
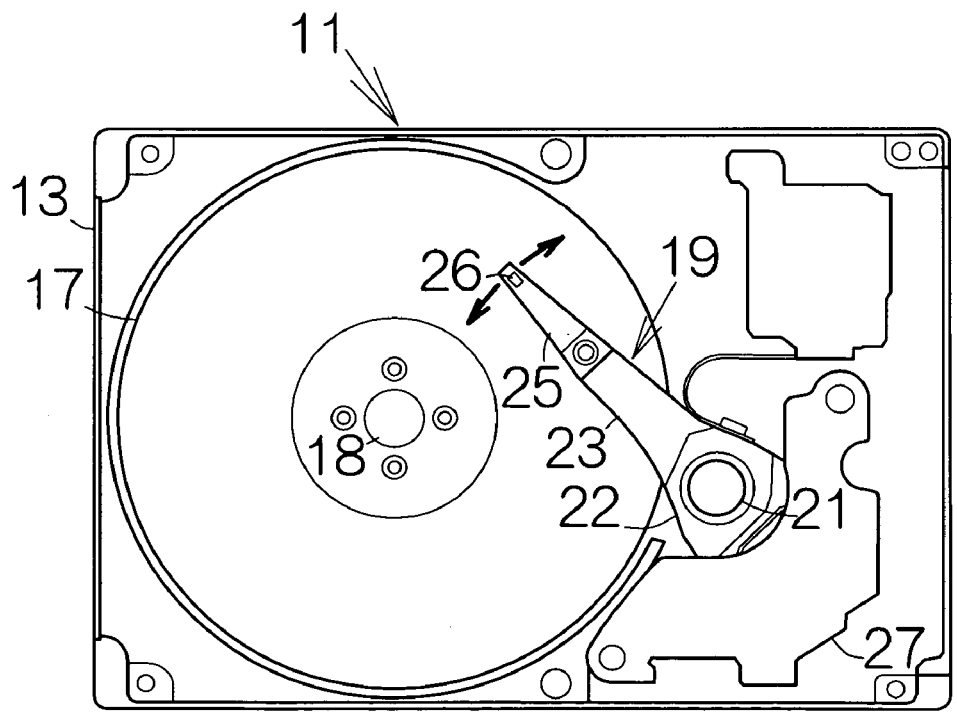
FIG. 2 is a plan view schematically illustrating the inner structure of the HDD.

As shown in FIG. 2, at least one magnetic recording disk 17 is incorporated in the inner space within the enclosure 12. The magnetic recording disk 17 is mounted on the driving shaft of a spindle motor 18. The spindle motor 18 is allowed to drive the magnetic recording disk 17 for rotation at a higher revolution speed such as 7,200 rpm or 10,000 rpm, for example.

A head actuator 19 is also incorporated within the inner space of the enclosure 12. The head actuator 19 includes an actuator block 22 supported on a vertical support shaft 21 for rotation. Rigid actuator arms 23 are defined in the actuator block 22. The actuator arms 23 are designed to extend in a horizontal direction from the vertical support shaft 21. The actuator arms 23 are associated with the front and back surfaces of the magnetic recording disk or disks 17, respectively. The actuator block 22 may be made of aluminum. Molding process may be employed to form the actuator block 22.

Elastic head suspensions 25 are fixed to the tip ends of the actuator arms 23. The individual head suspension 25 is designed to extend forward from the corresponding tip end of the actuator arm 23. As conventionally known, a flying head slider 26 is supported on the front end of the individual head suspension 25. The flying head slider 26 is associated with the actuator block 22 in this manner. The flying head sliders 26 are opposed to the surfaces of the magnetic recording disk or disks 17.

A magnetic head or read/write electromagnetic transducer, not shown, is mounted on the flying head slider 26. The read/write electromagnetic transducer includes, for example, a read element and a write element. The read element is represented by a giant magnetoresistive (GMR) element or a tunnel-junction magnetoresistive (TMR) element designed to utilize variation in the electric resistance of a spin valve film or tunnel-junction film so as to discriminate magnetic bit data on the magnetic recording disk 17. The write element is represented by a thin film magnetic head designed to utilize a magnetic field, generated at a thin film coil pattern, so as to record magnetic bit data into the magnetic recording disk 17.

The head suspension 25 serves to urge the flying head slider 26 toward the surface of the magnetic recording disk 17. When the magnetic recording disk 17 rotates, the flying head slider 26 is allowed to receive airflow generated along the rotating magnetic recording disk 17. The airflow serves to generate a lift on the flying head slider 26. The flying head slider 26 is thus allowed to keep flying above the surface of the magnetic recording disk 17 during the rotation of the magnetic recording disk 17 at a higher stability established by the balance between the lift and the urging force of the head suspension 25.

A power source 27 such as a voice coil motor (VCM) is connected to the tail of the actuator block 22. The power source 27 drives the actuator block 22 for rotation around the support shaft 21. The rotation of the actuator block 22 induces the swinging movement of the actuator arms 23 and the head suspensions 25. When the actuator arm 23 is driven to swing about the support shaft 21 during the flight of the flying head slider 26, the flying head slider 26 is allowed to cross the recording tracks defined on the magnetic recording disk 17 in the radial direction of the magnetic recording disk 17. This radial movement serves to position the flying head slider 26 right above a target recording track on the magnetic recording disk 17. As conventionally known, in the case where two or more magnetic recording disks 17 are incorporated within the inner space of the enclosure 12, a pair of the elastic head suspensions 25 and the actuator arms 23 are disposed between the adjacent magnetic recording disks 17.

Figure 3:
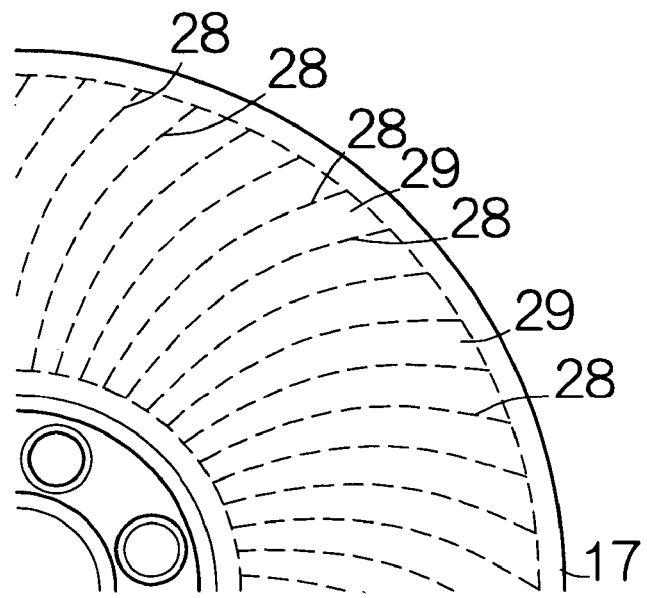
FIG. 3 is a partial plan view of a magnetic recording disk.

As shown in FIG. 3, stripes of bent servo sector regions 28, for example, sixty of those, are defined on the front and back surfaces of the magnetic recording disk 17, respectively. The individual servo sector regions 28 are designed to extend in the radial direction of the magnetic recording disk 17. Predetermined servo patterns are established in the servo sector regions 28. The read/write electromagnetic transducer on the flying head slider 26 is allowed to extract magnetic information out of the servo patterns. The extracted magnetic information is utilized to position the flying head slider 26 in the radial direction of the magnetic recording disk 17. The servo patterns will be described later in detail. The curvature of the servo sector region 28 is determined based on the path of movement of the read/write electromagnetic transducer.

Data storage regions 29 are established between the adjacent servo sector regions 28 for holding magnetic information or binary data. When the flying head slider 26 is positioned in the radial direction of the rotating magnetic recording disk 17, the read/write electromagnetic transducer on the flying head slider 26 is allowed to keep tracing a target recording track. The write element of the read/write electromagnetic transducer operates to establish a magnetic bit data on the data storage region 29 along the recording track. Likewise, the read element of the read/write electromagnetic transducer operates to read a string of bit data out of the data storage region 29 along the recording track.

Figure 4:
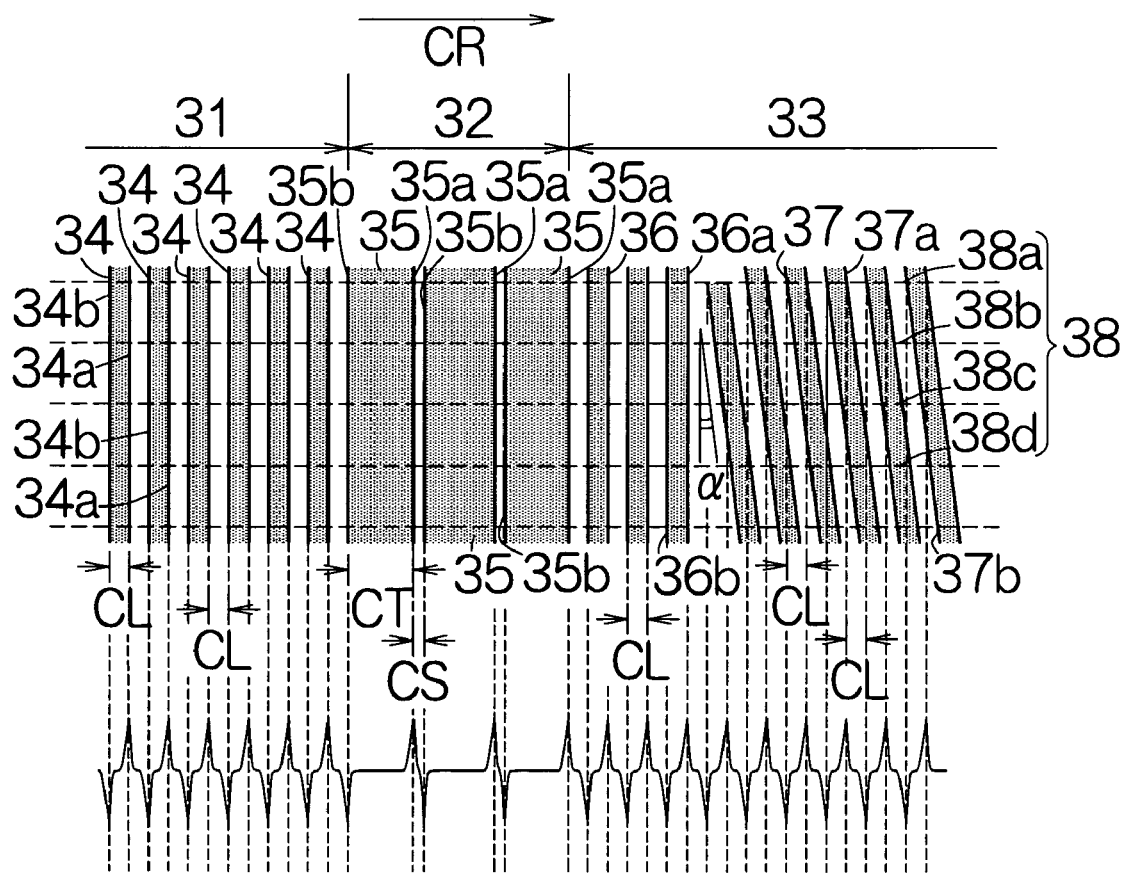
FIG. 4 illustrates the correlation between the magnetic poles in a servo sector region and the waveform of the reproduction signal.

As shown in FIG. 4, a preamble region 31, a servo mark region 32, and a servo data region 33 are, in this sequence from the upstream end, formed in the individual servo sector region 28, for example. The preamble region 31 includes synchronization magnetized stripes 34 extending on radii of the magnetic recording disk 17. Magnetization is established in the individual synchronization magnetized stripes 34 in a first circumferential direction CR of the magnetic recording disk 17. Magnetization is likewise established in a second circumferential direction, opposite to the first circumferential direction CR, outside the synchronization magnetized stripes 34. The magnetizations butt against each other at the downstream contours 34a of the synchronization magnetized stripes 34. The positive magnetic poles are thus established along the downstream contours 34a of the synchronization magnetized stripes 34. On the other hand, the magnetizations are directed apart in the opposite directions at the upstream contours 34b of the synchronization magnetized stripes 34. The negative magnetic poles are thus established along the upstream contours 34b of the synchronization magnetized stripes 34. The alternate positive and negative magnetic poles are in this manner formed in a predetermined iterant pattern in the preamble region 31. Here, the terms such as "upstream" and "downstream" are intended to specify the direction in accordance with the movement of the flying head slider 26 relative to the rotating magnetic recording disk 17.

A uniform space CL is set between the upstream contour 34b and the downstream contour 34a in the circumferential direction of the magnetic recording disk 17 in the individual synchronization magnetized stripes 34. Moreover, the uniform space CL is set between the adjacent synchronization magnetized stripes 34. Accordingly, the positive and negative magnetic poles are alternately located in the preamble region 31 at positions spaced by the uniform spaces CL in the circumferential direction of the magnetic recording disk 17.

Magnetized stripes 35 are established within the servo mark region 32. The magnetized stripes 35 extend on radii of the magnetic recording disk 17, for example. Magnetization is established in the individual magnetized stripes 35 in the first circumferential direction CR of the magnetic recording disk 17. Magnetization is likewise established in the second circumferential direction outside the magnetized stripes 35. The magnetizations butt against each other at the downstream contours 35a of the magnetized stripes 35. The positive magnetic poles are thus established along the downstream contours 35a of the magnetized stripes 35. On the other hand, the magnetizations are directed apart in the opposite directions at the upstream contours 35b of the magnetized stripes 35. The negative magnetic poles are thus established along the upstream contours 35b of the magnetized stripes 35. The alternate positive and negative magnetic poles are in this manner formed in a predetermined iterant pattern in the servo mark region 32.

A uniform space CT is set between the upstream contour 35b and the downstream contour 35a in the circumferential direction of the magnetic recording disk 17 in the individual magnetized stripes 35. The uniform space CT is preferably set different from the uniform space CL, in other words, smaller or larger than the uniform space CL. Likewise, a uniform space CS is set between the adjacent magnetized stripes 35. The uniform space CS is preferably set different from the uniform space CL. Accordingly, the arrangement of the positive and negative magnetic poles in the servo mark region 32 is distinguished from that in the preamble region 31. It should be noted that a space may independently be set between the upstream contour 35b and the downstream contour 35a in the individual magnetized stripes 35. A space may also independently be set between pairs of the adjacent magnetized stripes 35. Any pattern may be applied to the arrangement of the magnetic poles in the servo mark region 32 as long as the arrangement of the magnetic poles in the servo mark region 32 can sufficiently be distinguished from that in the aforementioned preamble region 31.

Reference magnetized stripes 36 and phase determination magnetized stripes 37 are established within the servo data region 33. The reference magnetized stripes 36 extend on radii of the magnetic recording disk 17, for example. The phase determination magnetized stripes 37 extend on inclined lines intersecting a radius by a predetermined inclination angle α. The reference magnetized stripes 36 are positioned closer to the servo mark region 32. The phase determination magnetized stripes 37 a repositioned downstream of the reference magnetized stripes 36. Magnetization is established in the individual reference and phase determination magnetized stripes 36, 37 in the first circumferential direction CR of the magnetic recording disk 17. Magnetization is likewise established in the second circumferential direction outside the reference and phase determination magnetized stripes 36, 37. The magnetizations butt against each other at the downstream contours 36a, 37a of the reference and phase determination magnetized stripes 36, 37. The positive magnetic poles are thus established along the downstream contours 36a, 37a of the reference and phase determination magnetized stripes 36, 37. On the other hand, the magnetizations are directed apart in the opposite directions at the upstream contours 36b, 37b of the reference and phase determination magnetized stripes 36, 37. The negative magnetic poles are thus established along the upstream contours 36b, 37b of the reference and phase determination magnetized stripes 36, 37. The magnetic poles are in this manner arranged in accordance with a predetermined pattern in the servo data region 33. In particular, the alternate positive and negative magnetic poles are formed in a predetermined iterant pattern at a position closest to the preamble region 31 in the same manner as the preamble region 31. The upstream contours 37b and the downstream contours 37a of the phase determination magnetized stripes 37 are described with straight lines inclined from the radius of the magnetic recording disk 17.

The uniform space CL is set between the upstream contour 36b and the downstream contour 36a in the circumferential direction of the magnetic recording disk 17 in the individual reference magnetized stripes 36 in the same manner as described above. Moreover, the uniform space CL is set between the adjacent reference magnetized stripes 36. Accordingly, the reference magnetized stripes 36 serve to establish positive and negative magnetic poles alternately located at positions spaced by the uniform spaces CL in the circumferential direction of the magnetic recording disk 17. Likewise, the uniform space CL is set between the upstream contour 37b and the downstream contour 37a in the circumferential direction of the magnetic recording disk 17 in the individual phase determination magnetized stripes 37. Moreover, the uniform space CL is set between the adjacent phase determination magnetized stripes 37. Accordingly, the phase determination magnetized stripes 37 serve to establish positive and negative magnetic poles alternately located at positions spaced by the uniform spaces CL in the circumferential direction of the magnetic recording disk 17.

Assume that the read element of the read/write electromagnetic transducer passes above the servo sector region 28 in the first circumferential direction CR. A maximum peak appears in a reproduction signal output from the read element of the read/write electromagnetic transducer in response to the presence of the positive magnetic pole. Likewise, a minimum peak appears in the reproduction signal from the read element in response to the presence of the negative magnetic pole. When the read element passes above the preamble region 31 in the first circumferential direction CR, the maximum and minimum peaks alternately appear in the reproduction signal at equal intervals, as shown in FIG. 4. The peaks are synchronized for recording tracks 38a–38d in a recording track set 38. Here, four of the recording tracks 38a–38d are contained in the individual recording track set 38, for example.

When the read element passes above the servo mark region 32 in the first circumferential direction CR, the maximum and minimum peaks alternately appear in the reproduction signal in a predetermined pattern. For example, the interval between the adjacent maximum peaks in the servo mark region 32 may be distinguished from that in the preamble region 31. The interval between the maximum and minimum peaks in the servo mark region 32 may alternatively or additionally be distinguished from that in the preamble region 31. The appearance of the peaks coincides for all the recording tracks 38a–38d in the recoding track set 38.

When the read element passes above the reference magnetized stripes 36 in the servo data region 33 in the first circumferential direction CR, the maximum and minimum peaks alternately appear in the reproduction signal at equal intervals. The peaks are synchronized for the recording tracks 38a–38d in the recording track set 38. The read element subsequently passes above the phase determination magnetized stripes 37 in the first circumferential direction CR. The maximum and minimum peaks alternately appear in the reproduction signal at equal intervals. In this case, the peaks appear at different phases for the recording tracks 38a–38d of the recording track set 38. In other words, time lags are established between the peaks of the recording tracks 38a–38d. This difference of the phase can be utilized to discriminate the recording tracks 38a–38d in the recording track set 38. When four of the recording tracks 38a–38d are included in the recording track set 38, for example, the half of pi ($\pi/2$) is set for the difference of the phase between the adjacent recording tracks 38a–38d.

Figure 5:
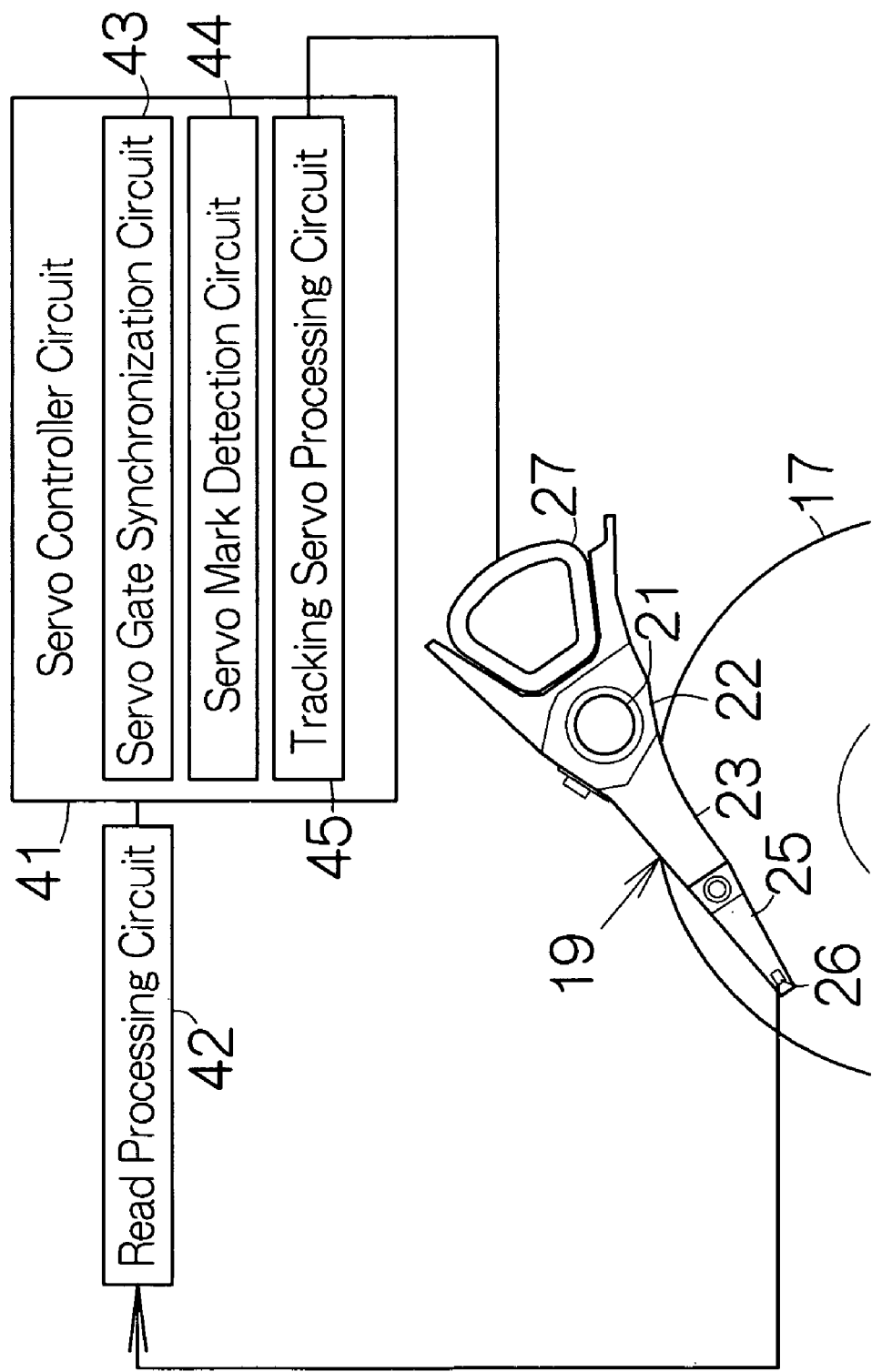
FIG. 5 is a block diagram schematically illustrating a control system of a tracking servo control.

As shown in FIG. 5, a servo controller circuit 41 is incorporated in the HDD 11. The servo controller circuit 41 serves to realize a so-called tracking servo control based on the magnetic information embedded in the servo sector region 28 in the aforementioned manner. The servo controller circuit 41 determines the amount of rotation for the head actuator 19 based on the deviation between the actual path of the flying head slider 26 and the predetermined orbit in the tracking servo control, as conventionally known. The read/write electromagnetic transducer on the flying head slider 26 is allowed to follow the predetermined orbit above the surface of the magnetic recording disk 17 based on the tracking servo control. The servo controller circuit 41 receives the reproduction signal, derived from the servo sector region 28, from a read processing circuit 42, for example. The read processing circuit 42 supplies the read element of the read/write electromagnetic transducer with a sensing current, for example. Variation in the electric resistance in the read element induces variation in the voltage in the sensing current.

A servo gate synchronization circuit 43 is designed to adjust the timing of a servo gate signal based on the reproduction signal derived from the preamble region 31. The servo gate signal identifies values "0" and "1" at predetermined timings in synchronization with the rotation of the magnetic recording disk 17, for example. In this case, the value "0" may be utilized to identify the data region 29 on the magnetic recording disk 17, while the value "1" may be utilized to identify the servo sector region 28 on the magnetic recording disk 17. The servo gate signal is utilized to allow the write operation of the read/write electromagnetic transducer over the data region 29. The servo gate signal is utilized to prohibit the write operation of the read/write electromagnetic transducer over the servo sector region 28.

A servo mark detection circuit 44 is designed to identify the reproduction signal derived form the servo mark region 32 in the overall reproduction signal. The servo mark detection circuit 44 generates a tracking servo gate signal based on the reproduction signal derived from the servo mark region 32. The values "0" and "1" may be identified in the tracking servo gate signal, for example. When the reproduction signal corresponding to the servo mark region 32 is detected, the value "0" changes over to the value "1" in the tracking servo gate signal, for example. The value "1" is kept in the tracking servo gate signal for a predetermined period. The value "1" thereafter changes over back to the value "0" in the tracking servo gate signal after the predetermined period has elapsed.

A tracking servo processing circuit 45 is designed to generate a control signal based on the reproduction signal derived from the servo data region 33 in a conventional manner. The control signal is supplied to the power source 27 of the head actuator 19. The power source 27 drives the head actuator 19 around the support shaft 21 in accordance with the magnitude of the control signal. The tracking servo control is realized in this manner. The tracking servo control allows the read/write electromagnetic transducer on the flying head slider 26 to follow the recording tracks 38a–38d on the magnetic recording disk 17 at a higher accuracy. The tracking servo processing circuit 45 starts generating the control signal when the tracking servo gate signal takes the value "1". The tracking servo processing circuit 45 may allow the tracking servo gate signal to return to the value "0" when the generation of the control signal has been completed, even before the predetermined period has elapsed.

Now, assume that the magnetic information is derived from the servo sector region 28 on the rotating magnetic recording disk 17 through the read element of the read/write electromagnetic transducer. The read/write electromagnetic transducer is first positioned relative to the target recording track set 38. The read/write electromagnetic transducer is then positioned above one of the recording tracks 38a–38d in the recording track set 38. In this situation, the values "0" and "1" are changed over in the servo gate signal in synchronization with the rotation of the magnetic recording disk 17. The value "1" in the servo gate signal identifies the servo sector region 28. While the servo gate signal keeps taking the value "1", the servo controller circuit 41 analyzes the reproduction signal derived from the servo sector region 28.

When the read element passes above the preamble region 31, the maximum and minimum peaks alternately appear in the reproduction signal at equal intervals in the aforementioned manner. The servo gate synchronization circuit 43 establishes the synchronization between the appearance of the peaks and the generation of the servo gate signal. The appearance of the peaks reflects the jitter or slippage of rotation of the magnetic recording disk 17, so that the servo gate signal is allowed to synchronize with the rotation of the magnetic recording disk 17. The effect of the jitter is in this manner eliminated during the tracking servo control.

The servo controller circuit 41 then detects the reproduction signal, derived from the servo mark region 32, from the overall reproduction signal. The servo controller circuit 41 searches the appearance of the maximum and minimum peaks to detect the reproduction signal corresponding to the servo mark region 32, for example. When the reproduction signal corresponding to the servo mark region 32 is detected, the servo mark detection circuit 44 causes the changeover from the value "0" to the value "1" in the tracking servo gate signal.

The tracking servo processing circuit 45 starts generating the control signal in response to the generation of the value "1" in the tracking servo gate signal. Periods are measured between the maximum and/or minimum peaks derived from the reference magnetized stripes 36 and the maximum and/or minimum peaks derived from the phase determination magnetized stripes 37. As is apparent from FIG. 4, in the case where the innermost recording track 38a is selected in the recording track set 38, for example, the maximum and minimum peaks should alternately appear at equal intervals of $2\pi$ all over the reference and phase determination magnetized stripes 36, 37. When the reproduction signal reflects this type of the maximum and minimum peaks, the read/write electromagnetic transducer is considered to be completely positioned. In the case where the second recording track 38b outside the innermost recording track 38a is selected, the interval of $2\pi$ and $\pi/2$ in total is to be established between the reference magnetized stripes 36 and the phase determination magnetized stripes 37. The read/write electromagnetic transducer is considered to be completely positioned when the reproduction signal reflects this type of the interval. Likewise, when the third recording track 38c outside the second recording track 38b is selected, the interval of $3\pi$ is to be established between the reference magnetized stripes 36 and the phase determination magnetized stripes 37. When the outermost recording track 38d is selected, the interval of $3\pi$ and $\pi/2$ in total is to be established between the reference magnetized stripes 36 and the phase determination magnetized stripes 37.

The HDD 11 of the aforementioned type enables a reduced space between the adjacent magnetic poles in the servo mark region 32. A sufficient intensity or strength can be insured at the individual magnetic poles. The magnetic poles have accordingly been established as designed. An additional magnetic pole weaker than the designed magnetic poles cannot be formed in the servo mark region 32.

Figure 6:
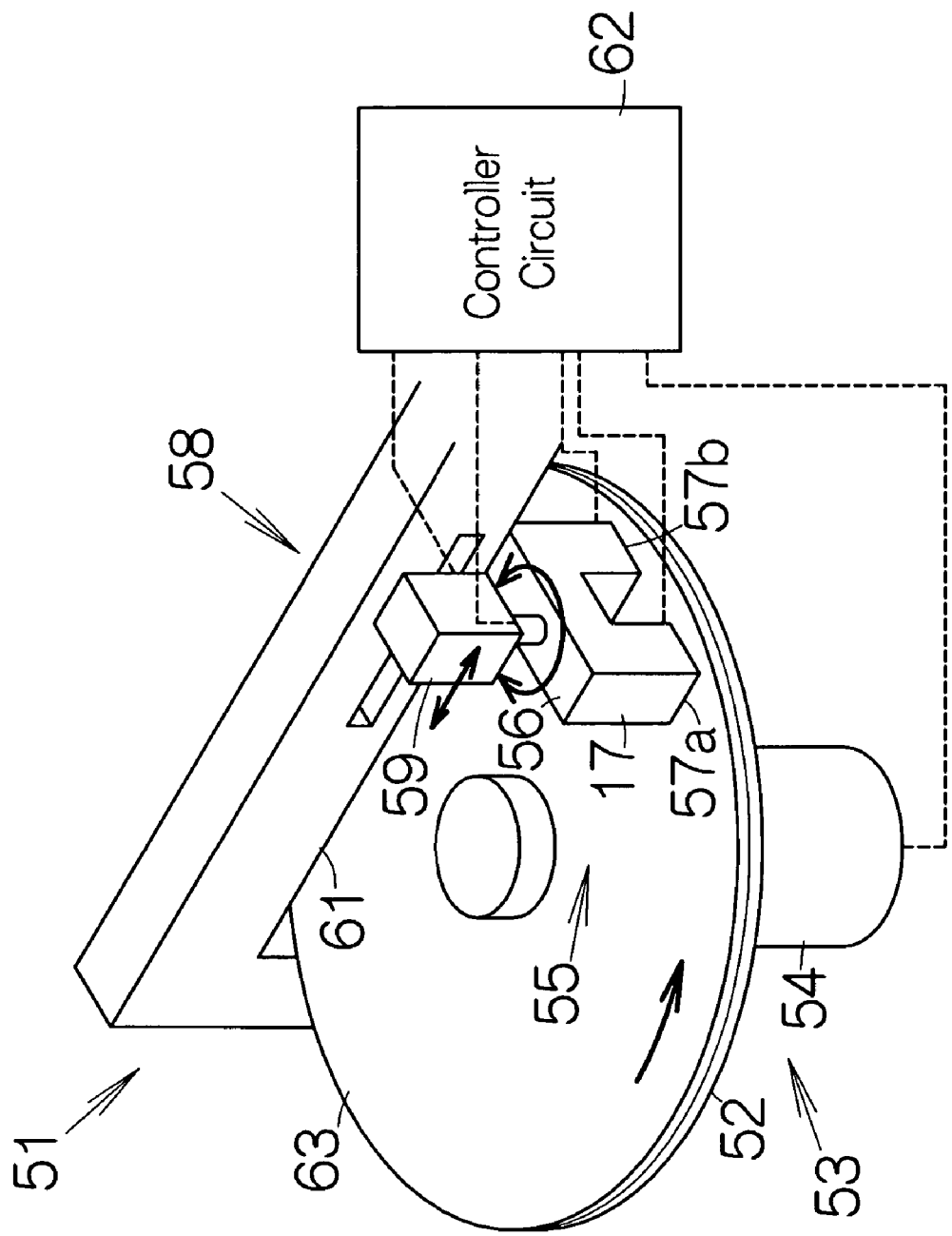
FIG. 6 is a perspective view schematically illustrating the structure of a magnetic transfer apparatus.

FIG. 6 schematically illustrates a magnetic transfer apparatus 51 utilized to establish the aforementioned servo pattern. The magnetic transfer apparatus 51 includes a support mechanism 53 designed to support a slave medium 52 such as a magnetic disk. A driving shaft 54 is located in the support mechanism 53 so as to extend in the vertical direction, for example. The driving shaft 54 receives the slave medium 52. The driving shaft 54 serves to drive the slave medium 52 for rotation within a predetermined horizontal plane.

A magnetizing mechanism 55 is associated with the support mechanism 53. The magnetizing mechanism 55 includes an electromagnet 56 designed to generate a magnetic field in response to supply of an electric current. The electromagnet 56 may include a magnetic core 57 and a coil, not shown, wound around the magnetic core 57, as conventionally known. When the slave medium 52 is mounted on the driving shaft 54, the electromagnet 56 opposes the opposite ends or magnetic poles 57a, 57b to the surface of the slave medium 52. Magnetic flux exchanged between the magnetic poles 57a, 57b forms a magnetic field. The magnetizing mechanism 55 may include a permanent magnet in place of the electromagnet 56.

A displacement mechanism 58 is coupled to the electromagnet 56. The displacement mechanism 58 includes a support member 59 and a guide rail 61, for example. The support member 59 is designed to hold the electromagnet 56 for relative rotation around a vertical rotation axis. The guide rail 61 is designed to guide a horizontal movement of the support member 59. The support member 59 may contain an electric motor as well as gears to drive the electromagnet 56 for rotation. When the slave medium 52 is mounted on the driving shaft 54, the electromagnet 56 is allowed to change its attitude around a rotation axis perpendicular to the surface of the slave medium 52.

A driving mechanism may be employed to drive the support member 59. The driving mechanism may include a rack and a pinion, for example. An electric motor is coupled to the pinion. The angular amount of rotation of the electric motor determines the amount of movement of the support member 59. When the support member 59 moves along the guide rail 61, the electromagnet 56 is allowed to move in a horizontal direction along a straight line passing through the central axis of the driving shaft 54. When the slave medium 52 is mounted on the driving shaft 54, the displacement mechanism 58 induces the horizontal movement of the electromagnet 56 along the radius of the slave medium 52.

A controller circuit 62 is connected to the magnetizing mechanism 55. The controller circuit 62 is designed to supply a predetermined electric signal to the electric motor assembled in the displacement mechanism 58, for example. The displacement mechanism 58 controls the movement of the support member 59 along the guide rail 61 based on the supplied electric signal. A position sensor, not shown, may be associated with the electromagnet 56. The position sensor may detect the position of the electromagnet 56 movable along the guide rail 61. The controller circuit 62 may control the movement of the support member 59 in accordance with a predetermined software program.

Likewise, the controller circuit 62 supplies a predetermined electric signal to a spindle motor, not shown, connected to the driving shaft 54. The rotation speed of the driving shaft 52, namely of the slave medium 52, is controlled based on the supplied electric signal. The controller circuit 62 may control the rotation speed of the driving shaft 54 in accordance with a predetermined software program. The displacement mechanism 58 and the spindle motor in combination serve to subject the entire surface of the slave medium 52 to a uniform exposure to a magnetic field acting from the electromagnet 56.

Furthermore, the controller circuit 62 may also supply a predetermined electric signal to an electric motor incorporated in the support member 59, for example. The attitude of the electromagnet 56 may be controlled around the rotation axis based on the supplied electric signal. Likewise, the controller circuit 62 may also control the magnitude and/or direction of the electric current supplied to the electromagnet 56. The aforementioned control may be established based on the processing of the controller circuit 62 in accordance with a predetermined software program. The surface of the slave medium 52 is in this manner allowed to receive the effect of a magnetic field from the electromagnet 56 at a predetermined uniform intensity in a predetermined direction.

A master medium 63 is incorporated in the magnetizing mechanism 56 when a servo pattern is to be established on the slave medium 52. The master medium 63 is superposed on the surface of the slave medium 52 mounted on the driving shaft 54. The master medium 63 is located in a space between the electromagnet 56 and the slave medium 52. When magnetic flux flows along the surface of the slave medium 52, the servo pattern can be established on the surface of the slave medium 52, as described later in detail.

Figure 7:
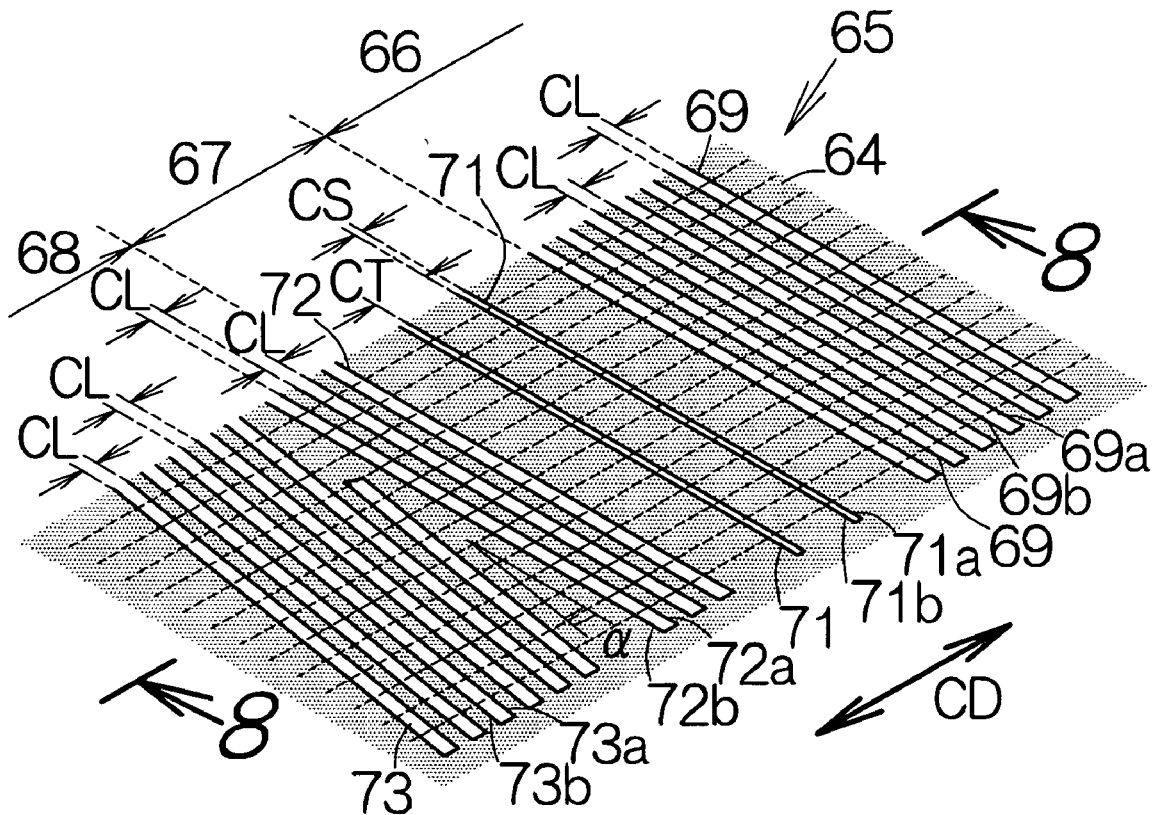
FIG. 7 is an enlarged partial perspective view schematically illustrating the structure of a master medium.

As shown in FIG. 7, the master medium 63 includes a disk-shaped non-magnetic substrate 64. The substrate 64 may be made of Si, $SiO_2$, or the like. The substrate 64 defines a surface opposed to the slave medium 52. Stripes of bent magnetic material distribution regions 65 are defined on such a surface. The respective magnetic material distribution regions 65 extend in the radial direction of the substrate 64. The bent magnetic material distribution region 65 corresponds to a reflection of the aforementioned servo sector region 28. A preamble reflection region 65, a servo mark reflection region 67 and a servo data reflection region 68 are, in this sequence from the upstream end, formed in the individual magnetic material distribution region 65. Stripes of first magnetic pieces 69 are embedded in the substrate 64 in the preamble reflection region 66. The first magnetic pieces 69 extend on radii of the substrate 64. The uniform space CL is set between the upstream contour 69a and the downstream contour 69b in the circumferential direction CD of the substrate 64 in the individual first magnetic pieces 69. The uniform space CL is also set between the adjacent first magnetic pieces 69. Accordingly, the upstream and downstream contours 69a, 69b of the first magnetic pieces 69 are alternately arranged in the circumferential direction CD at positions equally spaced by the uniform spaces CL. Here, "upstream" and "downstream" reflect those of the aforementioned magnetic recording disk 17.

Stripes of second magnetic pieces 71 are embedded in the substrate 64 in the servo mark reflection region 67. The second magnetic pieces 71 extend on radii of the substrate 64. A uniform space CS is set between the upstream contour 71a and the downstream contour 71b in the circumferential direction CD of the substrate 64 in the individual second magnetic pieces 71. A uniform space CT is likewise set between the adjacent second magnetic pieces 71. The second magnetic pieces 71 are in this manner arranged in accordance with a predetermined pattern different from that of the first magnetic pieces 69 in the circumferential direction CD of the substrate 64 in the servo mark reflection region 67.

Stripes of third magnetic pieces 72 are embedded in the substrate 64 in the servo data reflection region 68. The third magnetic pieces 72 extend on radii of the substrate 64, for example. The third magnetic pieces 72 are arranged adjacent the servo mark reflection region 67. The uniform space CL is set between the upstream contour 72a and downstream contour 72b in the circumferential direction CD of the substrate in the individual third magnetic pieces 72. The uniform space CL is also set between the adjacent third magnetic pieces 72. Accordingly, the upstream and downstream contours 72a, 72b of the third magnetic pieces 72 are alternately arranged in the circumferential direction at positions equally spaced by the uniform spaces CL.

Likewise, stripes of fourth magnetic pieces 73 are embedded in the substrate 64 in the servo data reflection region 68. The fourth magnetic pieces 73 extend on inclined lines intersecting a radius of the substrate 64 by a predetermined inclination angle α. The fourth magnetic pieces 73 are located downstream of the third magnetic pieces 72. The uniform space CL is set between the upstream contour 73a and the downstream contour 73b in the circumferential direction CD of the substrate 64 in the individual fourth magnetic pieces 73. The uniform space CL is also set between the adjacent fourth magnetic pieces. Accordingly, the upstream and downstream contours 73a, 73b of the fourth magnetic pieces 73 are alternately arranged in the circumferential direction CD at positions equally spaced by the uniform spaces CL.

Figure 8:
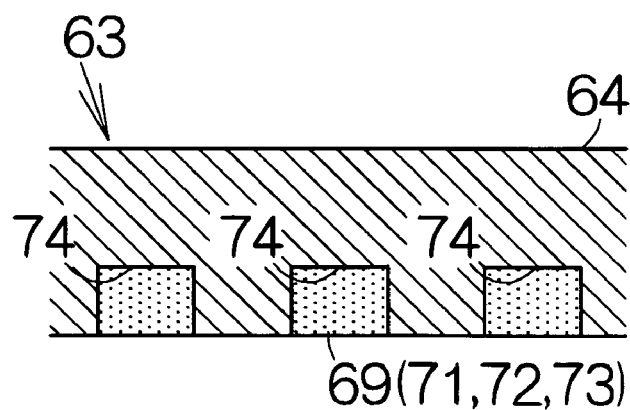
FIG. 8 is an enlarged partial sectional view taken along the lines 8—8 in FIG. 7.

As shown in FIG. 8, depressions or elongated grooves 74 are defined on the surface of the substrate 64 so as to form the magnetic pieces 69, 71, 72, 73. The magnetic pieces 69, 71, 72, 73 are filled in the elongated grooves 74. The surface of the substrate 64 may be covered with a protection film and/or a lubricant agent film, etc.

Figure 9:
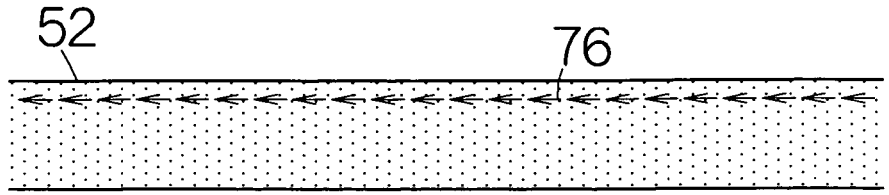
FIG. 9 is an enlarged partial sectional view of a slave medium for schematically illustrating the process of forming a servo pattern.

Assume that the servo pattern of the magnetic recording disk 17 is to be established in the magnetic transfer apparatus 51. A fresh slave medium 52 is first prepared. The slave medium 52 is mounted on the driving shaft 54 of the support mechanism 53. As shown in FIG. 9, magnetization 76 has previously been established on the surface of the slave medium 52 in the aforementioned second circumferential direction. The magnetic film of the slave medium 52 may have been exposed to magnetic flux circulating in the second circumferential direction so as to form the magnetization 76. The magnetizing mechanism 55 may be utilized to realize the circulation of the magnetic flux.

Figure 10:
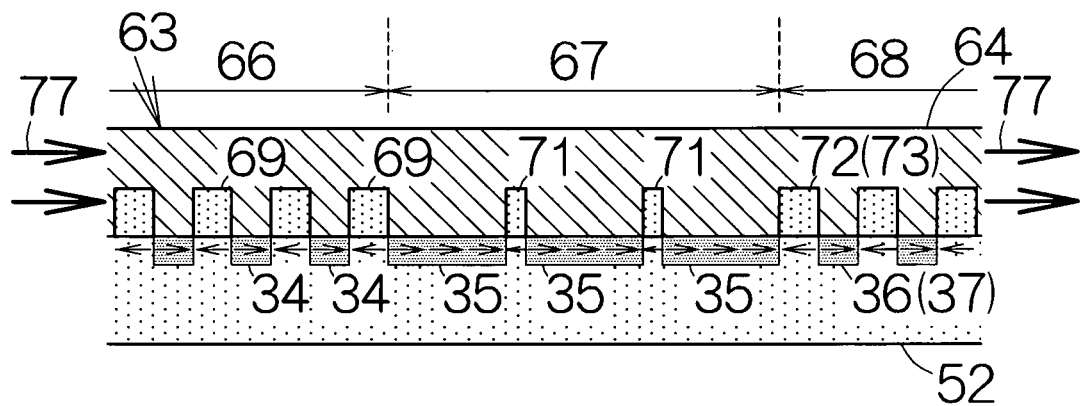
FIG. 10 is an enlarged partial sectional view of the master and slave media for schematically illustrating the process of forming the servo pattern.

The master medium 63 is superposed on the upper surface of the slave medium 52 in the magnetic transfer apparatus 51. The magnetic pieces 69, 71, 72, 73 on the master medium 63 are allowed to contact the surface of the slave medium 52. A predetermined magnetic field 77 is then applied to the master medium 63, as shown in FIG. 10. The magnetizing mechanism 55 can be utilized to generate the magnetic field 77. The magnetic field 77 induces the flow of magnetic flux in the circumferential direction. The magnetic flux penetrates through the magnetic pieces 69, 71, 72, 73. The magnetic flux runs around the substrate 64 between the adjacent magnetic pieces 69, 71, 72, 73. The magnetic flux thus induces leakage of the magnetic field from the master medium 63. The leaked magnetic field acts on the surface of the slave medium 52. The magnetization is accordingly established on the surface of the slave medium 52 in the aforementioned first circumferential direction CR. The leaked magnetic field from the first magnetic pieces 69 serves to establish the synchronization magnetized stripes 34 in the preamble region 31 on the slave medium 52. The leaked magnetic field from the second magnetic pieces 71 serves to establish the magnetized stripes 35 in the servo mark region 32 on the slave medium 52. The leaked magnetic field from the third magnetic pieces 72 serves to establish the reference magnetized stripes 36 in the servo data region 33 on the slave medium 52. The leaked magnetic field from the fourth magnetic pieces 73 serves to establish the phase determination magnetized stripes 37 in the servo data region 33 on the slave medium 52. The master medium 63 is allowed to entirely receive the magnetic field based on the rotation of the slave medium 52 and the radial movement of the magnetizing mechanism 55. The servo pattern can be established in this manner all over the slave medium 52.

Here, spaces can be reduced between the adjacent magnetic pieces 69, 71, 72, 73 on the master medium 63. In particular, smaller spaces can be set between the adjacent magnetic pieces 69, 71, 72, 73 as compared with the case where the master medium 63 fails to have the second magnetic pieces 71 within the servo mark reflection regions 67. The magnetic flux acting on the magnetic pieces 69, 71, 72, 73 thus enables generation of the leaked magnetic field of a sufficient intensity. Magnetization of a sufficient intensity can reliably be established on the slave medium 52. This serves to eliminate establishment of an additional weak magnetic pole on the slave medium 52. To the contrary, a larger space should be defined between the last one of the first magnetic pieces 69 and the first one of the third magnetic pieces 72 in the servo data reflection region 68 in the case where the second magnetic pieces 71 are not at all disposed within the servo mark reflection regions 67. The magnetic pieces 69, 72 serve to induce a weak leakage of the magnetic field across the larger space. Such a weak magnetic field inevitably forms a magnetic pole, weaker than the normal magnetic poles, at a position adjacent the servo data region 33 on the slave medium 52. If this additional weak magnetic pole is taken for the first magnetic pole of the servo data region 33, the tracking servo control is disturbed, so that the read/write electromagnetic transducer cannot correctly follow the recording tracks 38a–38d. The determination of the spaces between the adjacent magnetic pieces 69, 71, 72, 73 on the master medium 63 may depend on the intensity of the magnetic field acting from the magnetizing mechanism 55, the saturation magnetic flux density of the magnetic film covering over the slave medium 52, and the like.

In general, a so-called servo track writer is designed to establish a servo pattern in a complete HDD. A read/write electromagnetic transducer on a head slider in the HDD is utilized to write the servo pattern onto magnetic recording disks. The head slider must accurately be positioned relative to the magnetic recording disks in the HDD. The servo track writer utilizes an insert pin to position the head slider. The insert pin is inserted into the enclosure for driving a head actuator carrying the head slider. On the other hand, the magnetic transfer apparatus 51 is designed to establish a servo pattern on a bare magnetic recording disk 17. The magnetic recording disk 17 with the established servo pattern can be incorporated within a HDD. The insert pin is not required to position the head slider in the HDD. Accordingly, the bore, for receiving the inert pin, can be eliminated from the enclosure 12 of the HDD 11 as mentioned above.

Figure 11:
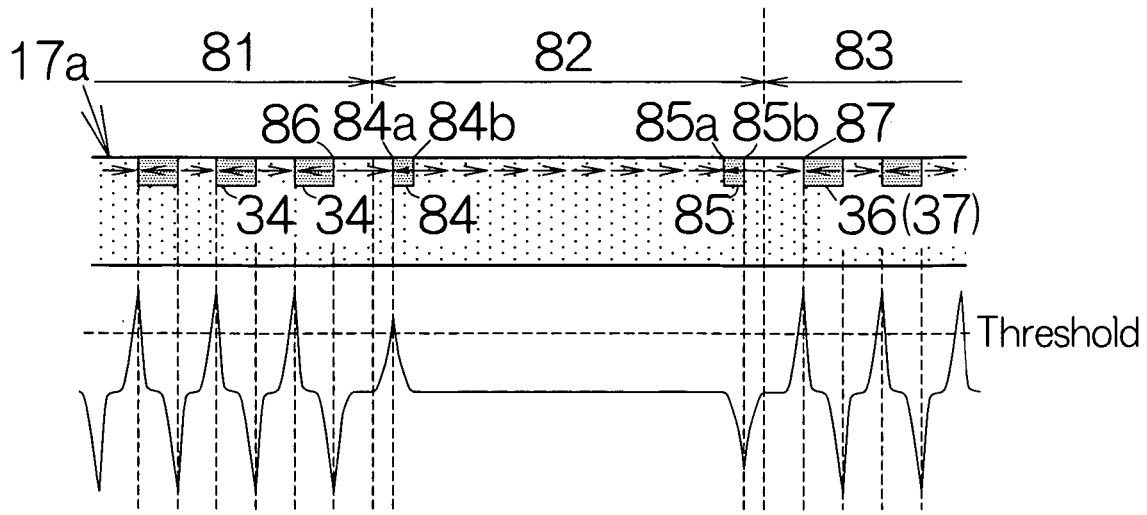
FIG. 11 illustrates the correlation between the magnetic poles in a servo sector region and the waveform of the reproduction signal for a magnetic recording disk incorporated within a HDD according to a second embodiment of the present invention.

A HDD according to a second embodiment of the present invention includes a magnetic recording disk 17a, in place of the magnetic recording disk 17, within the enclosure 12. As shown in FIG. 11, a preamble region 81, a servo mark region 82 and a servo data region 83 are, in this sequence from the upstream end, formed in the individual servo sector region 28 on the magnetic recording disk 17a, for example. The preamble and servo data regions 81, 83 have structures identical to that of the aforementioned preamble and servo data regions 31, 33. It should be noted that the magnetizations butt against each other at the upstream contours 34b of the individual synchronization magnetized stripes 34 in the preamble region 81. The positive magnetic poles are thus established along the upstream contours 34b of the synchronization magnetized stripes 34. On the other hand, the magnetizations are directed apart in the opposite directions at the downstream contours 34a of the synchronization magnetized stripes 34. The negative magnetic poles are thus established along the downstream contours 34a of the synchronization magnetized stripes 34. Likewise, the magnetizations butt against each other at the upstream contours 36b, 37b of the individual reference and phase determination magnetized stripes 36, 37 in the servo data region 83. The positive magnetic poles are thus established along the upstream contours 36b, 37b of the reference and phase determination magnetized stripes 36, 37. On the other hand, the magnetizations are directed apart in the opposite directions at the downstream contours 36a, 37a of the reference and phase determination magnetized stripes 36, 37. The negative magnetic poles are thus established along the downstream contours 36a, 37a of the reference and phase determination magnetized stripes 36, 37.

First and second weak magnetized stripes 84, 85 are formed in the servo mark region 82. The first and second weak magnetized stripes 84, 85 extend on radii of the magnetic recording disk 17a. The first weak magnetized stripe 84 is located adjacent the preamble region 81. The second weak magnetized stripe 85 is located adjacent the data servo region 83. Magnetization is established in the first and second weak magnetized stripes 84, 85 in the direction identical to that of the synchronization magnetized stripes 34 in the preamble region 81 and the reference magnetized stripes 36 in the servo data region 83. Accordingly, the magnetizations butt against each other at the upstream contours 84a, 85a of the first and second weak magnetized stripes 84, 85. The positive magnetic poles are thus established along the upstream contours 84a, 84a of the first and second weak magnetized stripes 84, 85. On the other hand, the magnetizations are directed apart in the opposite directions at the downstream contours 84b, 85b of the first and second weak magnetized stripes 84, 85. The negative magnetic poles are thus established along the downstream contours 84b, 85b of the first and second weak magnetized stripes 84, 85. It should be noted that the intensity or strength of the magnetizations in the first and second weak magnetized stripes 84, 85 is smaller than that of the synchronization and reference magnetized stripes 34, 36. The magnetic poles along the first and second weak magnetized stripes 84, 85 has the absolute value of the intensity smaller than that of the magnetic poles along the synchronization, reference and phase determination magnetized stripes 34, 36, 37. The first weak magnetized stripe 84 serves to establish a magnetic pole located adjacent the preamble region 81. Such a magnetic pole has a polarity different from that of the last magnetic pole 86 of the preamble region 81 and intensity smaller than that of the last magnetic pole 86. The second weak magnetized stripe 85 likewise serves to establish a magnetic pole located adjacent the servo data region 83. Such a magnetic pole has a polarity different from that of the first magnetic pole 87 of the servo data region 83 and intensity smaller than that of the first magnetic pole 87. Otherwise, the HDD of the second embodiment has the structure identical to the HDD 11 of the first embodiment. Like reference numerals are attached to structure or components equivalent to those of the first embodiment.

As is apparent from FIG. 11, when the read element of the read/write electromagnetic transducer passes above the preamble region 81 in the first circumferential direction CR, the maximum and minimum peaks alternately appear in the reproduction signal at equal intervals in the same manner as described above. A minimum peak appears in the reproduction signal in response to the presence of the last magnetic pole 86 in the preamble region 81. The read element subsequently enters the servo mark region 82. A large peak appears in the reproduction signal. The large peak is smaller than the maximum peaks. The read element then keeps passing above the servo mark region 82. A small peak appears in the reproduction signal. The small peak is larger than the minimum peaks. Specifically, the absolute value of the small peak is smaller than the absolute value of the minimum peak. The read element subsequently enters the servo data region 83. The maximum peak appears in the reproduction signal in response to the presence of the first magnetic pole 87 in the servo data region 83. The read element thereafter keeps passing above the servo data region 83. The maximum and minimum peaks alternately appear in the reproduction signal at equal intervals based on the reference magnetized stripes 36 in the same manner as described above. When the read element passes above the phase determination stripes 37 in the first circumferential direction CR, the maximum and minimum peaks alternately appear in the reproduction signal at equal intervals. The peaks appear at different phases for the recording tracks 38a–38d of the recording track set 38. In other words, time lags are established between the peaks of the recording tracks 38a–38d.

Figure 12:
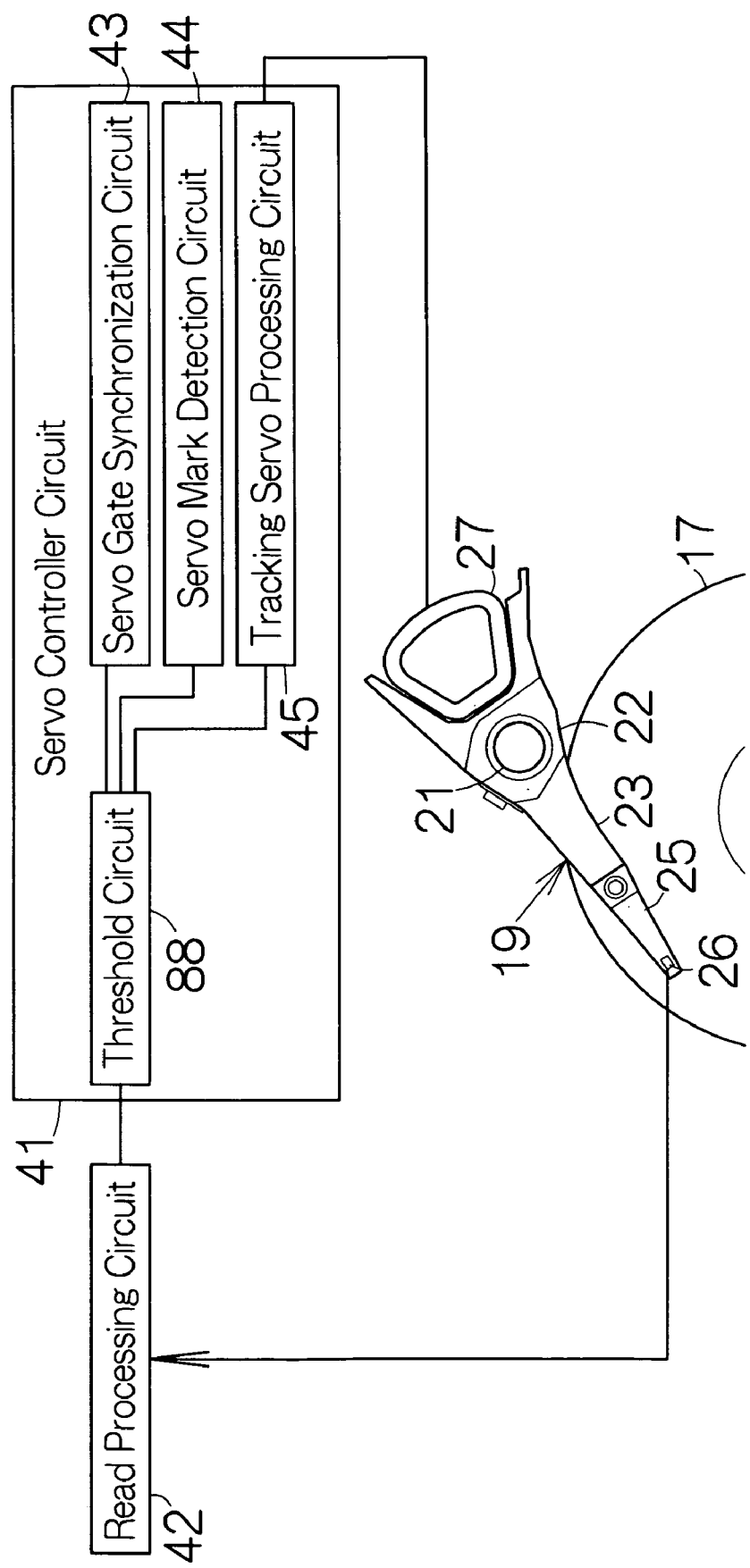
FIG. 12 is a block diagram schematically illustrating the structure of a servo controller circuit incorporated within a HDD of the second embodiment.

As shown in FIG. 12, a threshold circuit 88 is incorporated in the servo controller circuit 41. Here, the threshold circuit 88 sets a threshold to the maximum peaks in the reproduction signal. It is judged whether or not the reproduction signal exceeds the set threshold. For example, the threshold circuit 88 is allowed to detect the aforementioned maximum peaks and the large peak. The servo gate synchronization circuit 43 adjusts the timing of the servo gate signal based on the period of the maximum peaks. The servo mark detection circuit 44 searches the discontinuity or vanishment of the maximum peaks in the reproduction signal. The servo mark detection circuit 44 identifies the servo mark region 82 based on the discontinuity of the maximum peaks. The tracking servo processing circuit 45 generates the aforementioned control signal based on the period of the maximum peaks. Like reference numerals are attached to structure or components equivalent to those of the aforementioned first embodiment.

The aforementioned HDD enables an accurate detection of the servo mark region 82 irrespective of the presence of the first and second weak magnetized stripes 84, 85. In particular, the first magnetic pole 87 of the servo data region 83 can be detected at the correct timing irrespective of the presence of the second weak magnetized stripe 85. An accurate tracking servo control can be achieved irrespective of the presence of an additional weak magnetic pole in this manner. The read/write electromagnetic transducer on the flying head slider 26 is allowed to accurately follow the recording tracks on the magnetic recording disk 17a. Additionally, the servo gate synchronization circuit 43 is allowed to correctly operate irrespective of the presence of the first weak magnetized stripe 84. The servo gate synchronization circuit 43 enables the synchronization of the servo gate signal with the rotation of the magnetic recording disk 17a without the reproduction signal corresponding to the first weak magnetized stripe 84.

Figure 13:
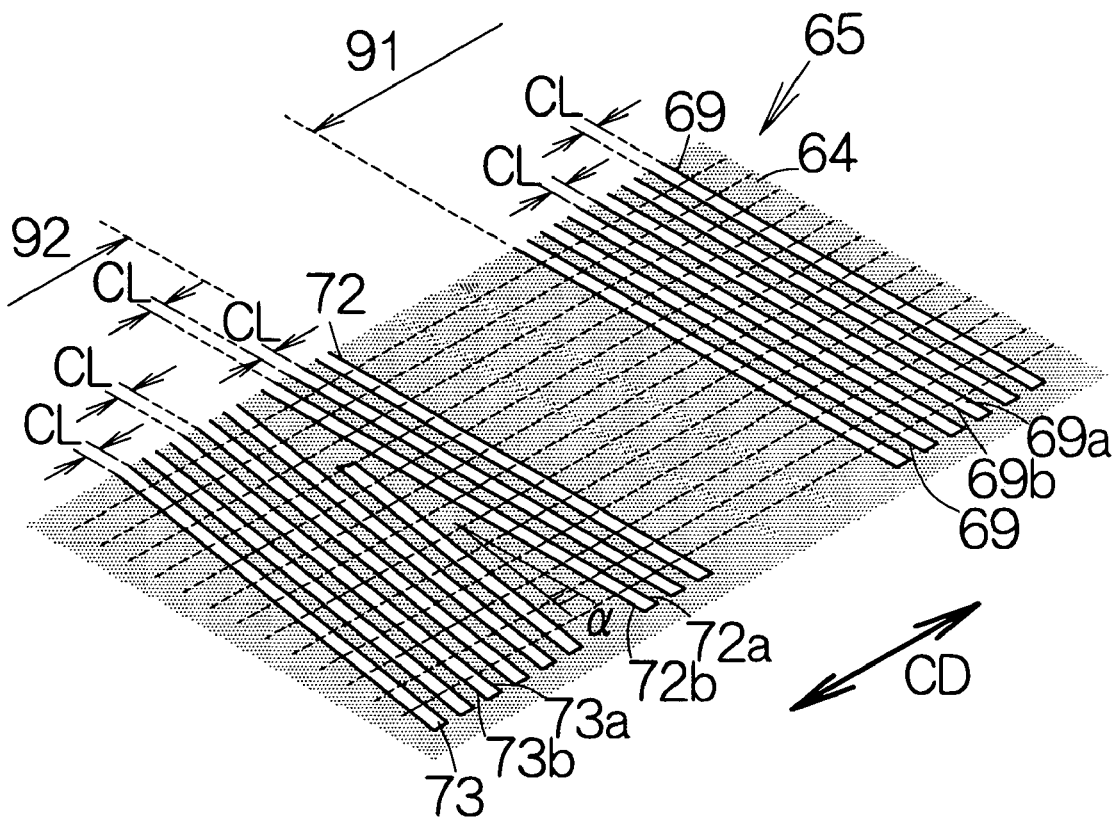
FIG. 13 is an enlarged partial perspective view schematically illustrating the structure of a master medium.

The aforementioned magnetic transfer apparatus 51 can be used to make the magnetic recording disk 17a. In this case, a master medium 89 includes a preamble reflection region 91 and a servo data reflection region 92 arranged in this sequence from the upstream end in the individual magnetic material distribution region 65, as shown in FIG. 13, for example. A predetermined space is defined between the preamble reflection region 91 and the servo data reflection region 92 in the circumferential direction CD of the substrate. The space corresponds to the extent of the servo mark region 82 on the magnetic recording disk 17a. The preamble reflection region 91 and the servo data reflection region 92 may have structure identical to that of the aforementioned preamble reflection region 66 and the servo data reflection region 68, respectively. Like reference numerals are attached to structure or components equivalent to those of the aforementioned first embodiment.

Figure 14:
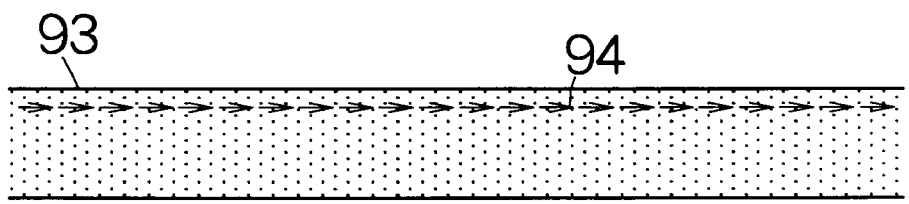
FIG. 14 is an enlarged partial sectional view of a slave medium for schematically illustrating the process of forming a servo pattern.

Now, assume that the servo pattern is established on the magnetic recording disk 17a in the magnetic transfer apparatus 51. A fresh slave medium 93 is first prepared. The slave medium 93 is mounted on the driving shaft 54 of the support mechanism 53. As shown in FIG. 14, magnetization 94 has previously been established on the surface of the slave medium 93 in the aforementioned second circumferential direction. The magnetic film of the slave medium 93 may have been exposed to magnetic flux circulating in the second circumferential direction so as to form the magnetization 94. The magnetizing mechanism 55 may be utilized to realize the circulation of the magnetic flux.

Figure 15:
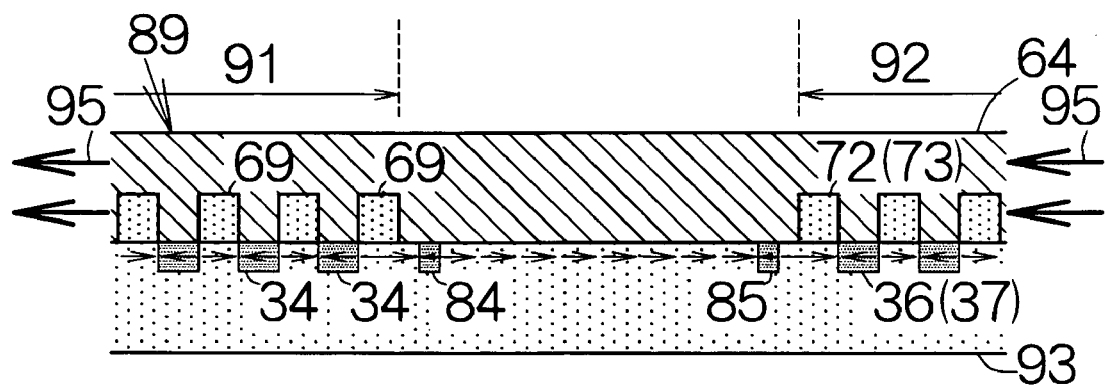
FIG. 15 is an enlarged partial sectional view of the master and slave media for schematically illustrating the process of forming the servo pattern.

The master medium 89 is superposed on the upper surface of the slave medium 93 in the magnetic transfer apparatus 51. The magnetic pieces 69, 72, 73 on the master medium 89 are allowed to contact the surface of the slave medium 93. A predetermined magnetic field 95 is then applied to the master medium 89, as shown in FIG. 15. The magnetizing mechanism 55 can be utilized to generate the magnetic field 95. The magnetic field 95 induces the flow of magnetic flux in the circumferential direction CD. The magnetic flux penetrates through the magnetic pieces 69, 72, 73. The magnetic flux runs around the substrate 64 between the adjacent magnetic pieces 69, 72, 73. The magnetic flux thus induces leakage of the magnetic field from the master medium 89. The leaked magnetic field acts on the surface of the slave medium 93. The magnetization is accordingly established on the surface of the slave medium 93 in the aforementioned first circumferential direction CR. The leaked magnetic field from the first magnetic pieces 69 serves to establish the synchronization magnetized stripes 34 in the preamble region 81 on the slave medium 93. The leaked magnetic field from the third magnetic pieces 72 serves to establish the reference magnetized stripes 36 in the servo data region 83 on the slave medium 93. The leaked magnetic field from the fourth magnetic pieces 73 serves to establish the phase determination magnetized stripes 37 in the servo data region 83 on the slave medium 93.

Here, a larger space is defined between the first magnetic pieces 69 and the third magnetic pieces 72 on the master medium 89. The magnetic pieces 69, 72 serve to induce a weak leakage of the magnetic field across the larger space. The weak leaked magnetic field acts on the slave medium 93, namely the servo mark region 82 on the magnetic recording disk 17a. As a result, the first and second weak magnetized stripes 84, 85 can be established within the servo mark region 83 at positions adjacent the preamble region 81 and the servo data region 83.

Figure 16:
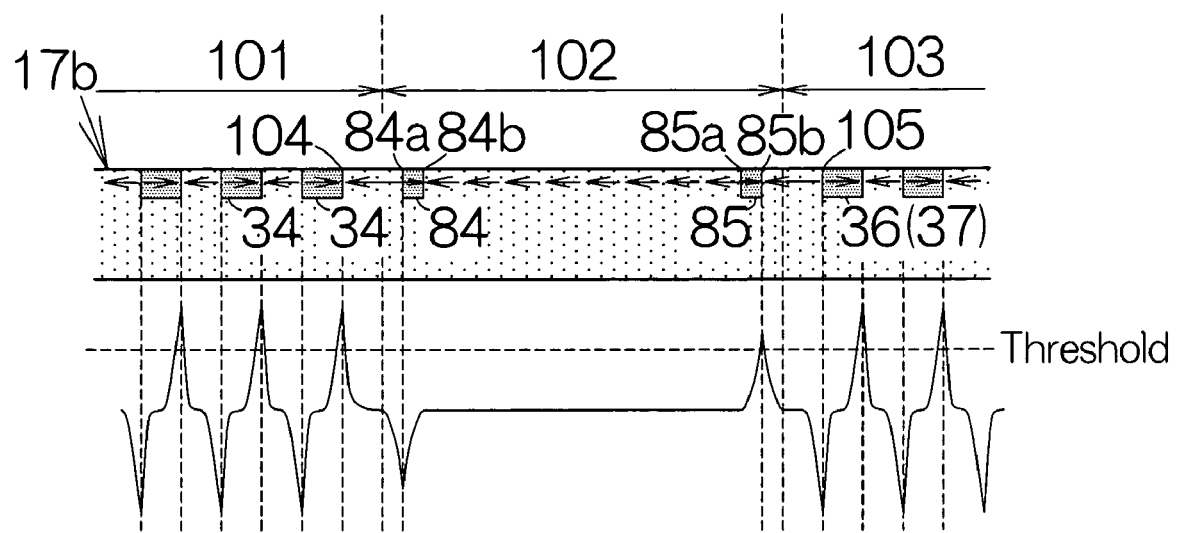
FIG. 16 illustrates the correlation between the magnetic poles in a servo sector region and the waveform of the reproduction signal for a magnetic recording disk incorporated within a HDD according to a third embodiment of the present invention.

A HDD according to a third embodiment of the present invention includes a magnetic recording disk 17b, in place of the magnetic recording disk 17, within the enclosure 12. As shown in FIG. 16, a preamble region 101, a servo mark region 102 and a servo data region 103 are, in this sequence from the upstream end, formed in the individual servo sector region 28 on the magnetic recording disk 17b, for example. The preamble and servo data regions 101, 103 have structures identical to that of the aforementioned preamble and servo data regions 31, 33. The servo mark region 102 has a structure identical to that of the aforementioned servo mark region 82. It should be noted that magnetization is established in the first and second weak magnetized stripes 84, 85 in the direction identical to the magnetization of the synchronization magnetized stripes 34 in the preamble region 101 as well as of the reference magnetized stripes 36 in the servo data region 103, so that the magnetizations butt against each other at the downstream contours 84b, 85b of the first and second weak magnetized stripes 84, 85. The positive magnetic poles are thus established along the downstream contours 84b, 85b of the first and second weak magnetized stripes 84, 85. On the other hand, the magnetizations are directed apart in the opposite directions at the upstream contours 84a, 85a of the first and second weak magnetized stripes 84, 85. The negative magnetic poles are thus established along the upstream contours 84a, 85a of the first and second weak magnetized stripes 84, 85. As described above, the magnetic poles along the first and second weak magnetized stripes 84, 85 has the absolute value of the intensity smaller than that of the magnetic poles along the synchronization, reference and phase determination magnetized stripes 34, 36, 37. Otherwise, the HDD of the third embodiment has the structure identical to the HDD 11 of the first embodiment. Like reference numerals are attached to structure or components equivalent to those of the first and second embodiments.

As is apparent from FIG. 16, when the read element of the read/write electromagnetic transducer passes above the preamble region 101 in the first circumferential direction CR, the maximum and minimum peaks alternately appear in the reproduction signal at equal intervals in the same manner as described above. A maximum peak appears in the reproduction signal in response to the presence of the last magnetic pole 104 in the preamble region 101. The read element subsequently enters the servo mark region 102. A small peak appears in the reproduction signal. The small peak is larger than the minimum peaks. Specifically, the absolute value of the small peak is smaller than the absolute value of the minimum peak. The read element then keeps passing above the servo mark region 102. A large peak appears in the reproduction signal. The large peak is smaller than the maximum peaks. The read element subsequently enters the servo data region 103. The minimum peak appears in the reproduction signal in response to the presence of the first magnetic pole 105 in the servo data region 103. The read element thereafter keeps passing above the servo data region 103. The maximum and minimum peaks alternately appear in the reproduction signal at equal intervals based on the reference magnetized stripes 36 in the same manner as described above. When the read element passes above the phase determination stripes 37 in the first circumferential direction CR, the maximum and minimum peaks alternately appear in the reproduction signal at equal intervals.

Figure 17:
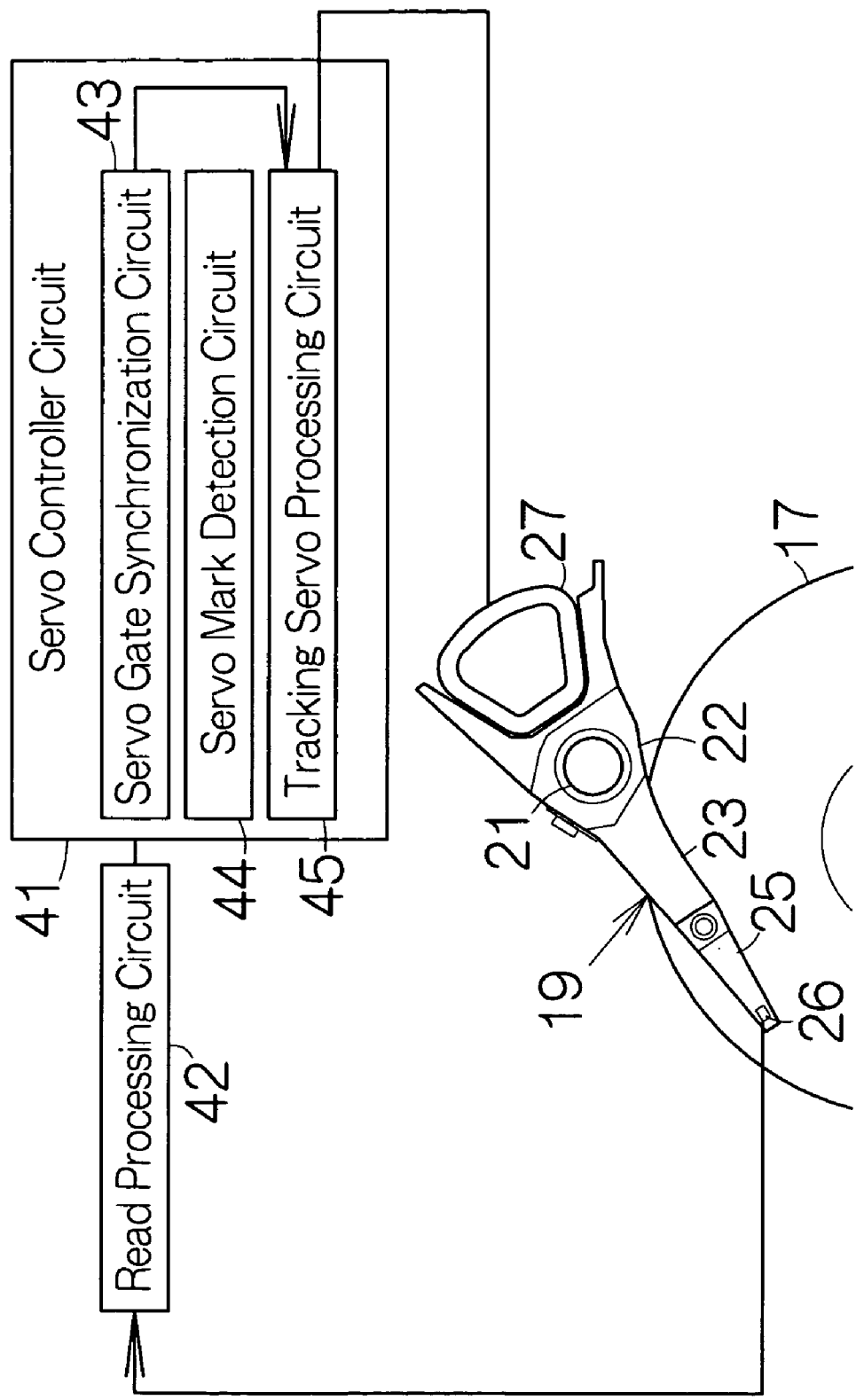
FIG. 17 is a block diagram schematically illustrating the structure of a servo controller circuit incorporated within a HDD of the third embodiment.

As shown in FIG. 17, the servo gate synchronization circuit 43 is designed to supply a synchronization signal to the tracking servo processing circuit 45 in the servo controller circuit 41 of the HDD. The servo gate synchronization circuit 43 generates the synchronization signal based on the period of the maximum peaks in the reproduction signal derived from the preamble region 101. The tracking servo processing circuit 45 generates the aforementioned control signal based on the period of the maximum peaks while the tracking servo processing circuit 45 maintains the synchronization to the period of the maximum peaks based on the synchronization signal. Like reference numerals are attached to structure and components equivalent to those of the aforementioned first embodiment.

The large peak appears in the reproduction signal off the phase of the maximum peaks in the HDD. Specifically, the appearance of the large peak fails to synchronize with the appearance of the maximum peaks. The tracking servo processing circuit 45 need not utilize the large peak to achieve the set operation. The servo mark region 102 is thus accurately detected irrespective of the presence of the first and second weak magnetized stripes 84, 85. In particular, the first magnetic pole 105 of the servo data region 103 can be detected at the correct timing irrespective of the presence of the second weak magnetized stripe 85. An accurate tracking servo control can be achieved irrespective of the presence of an additional weak magnetic pole in this manner. The read/write electromagnetic transducer on the flying head slider 26 is allowed to accurately follow the recording tracks on the magnetic recording disk 17b.

The magnetic recording disk 17b may be made in the same manner as the aforementioned magnetic recording disk 17a. In this case, magnetization should first be established in the direction opposite to the magnetization 94 on the fresh slave medium 93.

Figure 18:
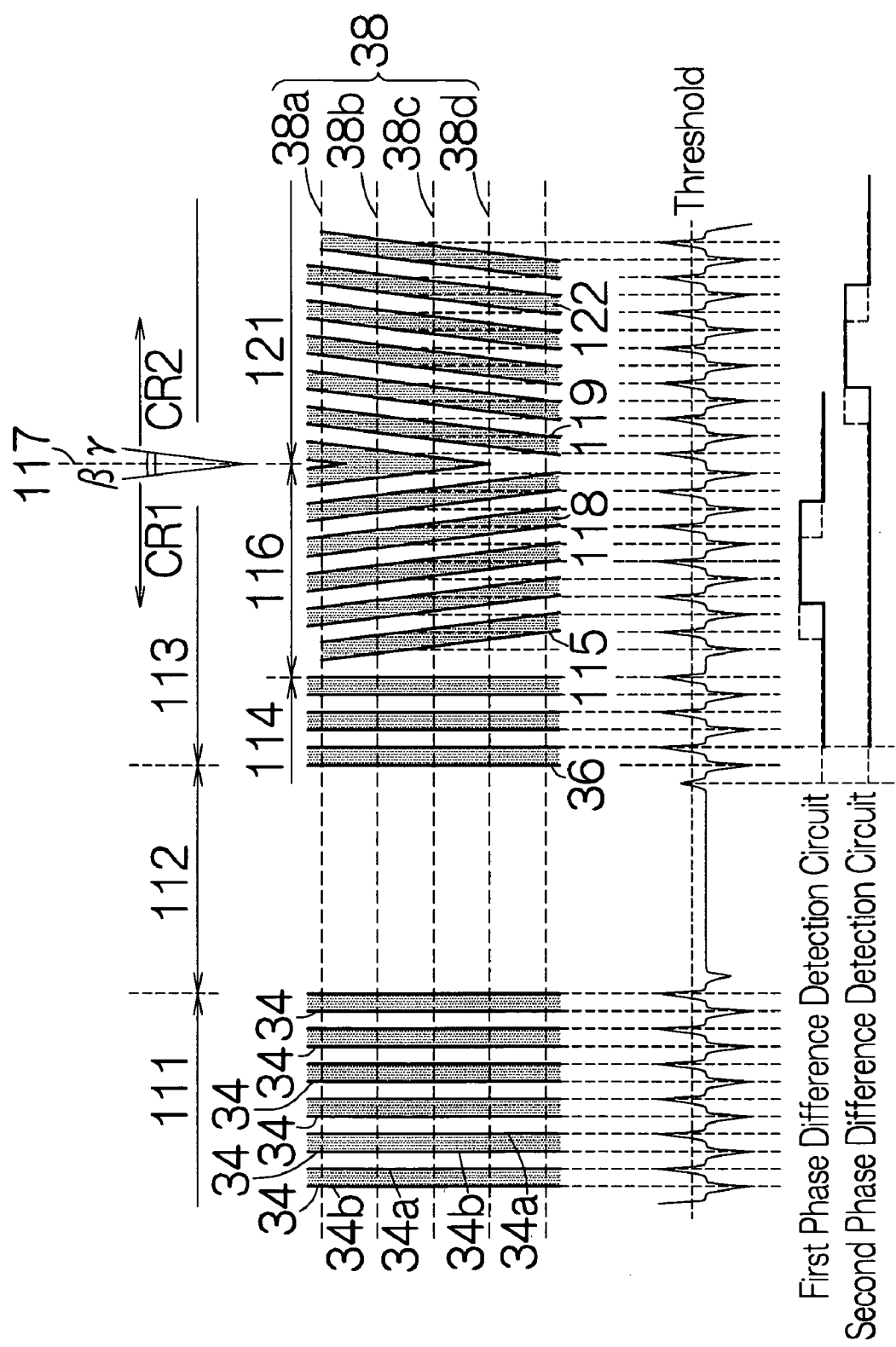
FIG. 18 illustrates the correlation between the magnetic poles in a servo sector region and the waveform of the reproduction signal for a magnetic recording disk incorporated within a HDD according to a fourth embodiment of the present invention.

A HDD according to a fourth embodiment of the present invention includes a magnetic recording disk 17c, in place of the magnetic recording disk 17, within the enclosure 12. As shown in FIG. 18, a preamble region 111, a servo mark region 112 and a servo data region 113 are, in this sequence from the upstream end, formed in the individual servo sector region 28 on the magnetic recording disk 17c, for example. The preamble and servo mark regions 111, 112 have structures identical to that of the aforementioned preamble and servo mark regions 31, 102.

The servo data region 113 includes a referential information region 114 dividing magnetizations by radii of the magnetic recording disk 17c. The reference magnetized stripes 36 are established within the referential information region 114 in the same manner as described above. A first positional information region 116 is formed downstream of the referential information region 114. The first positional information region 116 is designed to divide magnetizations by first referential lines 115. The individual first referential lines 115 are inclined in a first circumferential direction CR1 from a datum radial line 117 by an inclination angle β. First phase determination magnetized stripes 118 are established in the first positional information region 116. The first phase determination magnetized stripes 118 extend on inclined lines intersecting a radius by the inclination angle β in the same manner as the aforementioned phase determination magnetized stripes 37. Likewise, a second positional information region 121 is formed downstream of the first positional information region 116. The second positional information region 121 is designed to divide magnetizations by second referential lines 119. The individual second referential lines 119 are inclined in a second circumferential direction CR2, opposite to the first circumferential direction CR1, from the datum radial line 117 by an inclination angle γ. Here, the inclination angle γ may be identical to the inclination angle β. The second phase determination magnetized stripes 122 extend on inclined lines intersecting a radius by the inclination angle γ in the same manner as the aforementioned phase determination magnetized stripes 37. The inclination of the second phase determination magnetized stripes 122 are directed opposite to the inclination of the first phase determination magnetized stripes 118 relative to the datum radial line 117. Otherwise, the HDD of the fourth embodiment has the structure identical to the HDD 11 of the first embodiment. Like reference numerals are attached to structure or components equivalent to those of the first to third embodiments.

Figure 19:
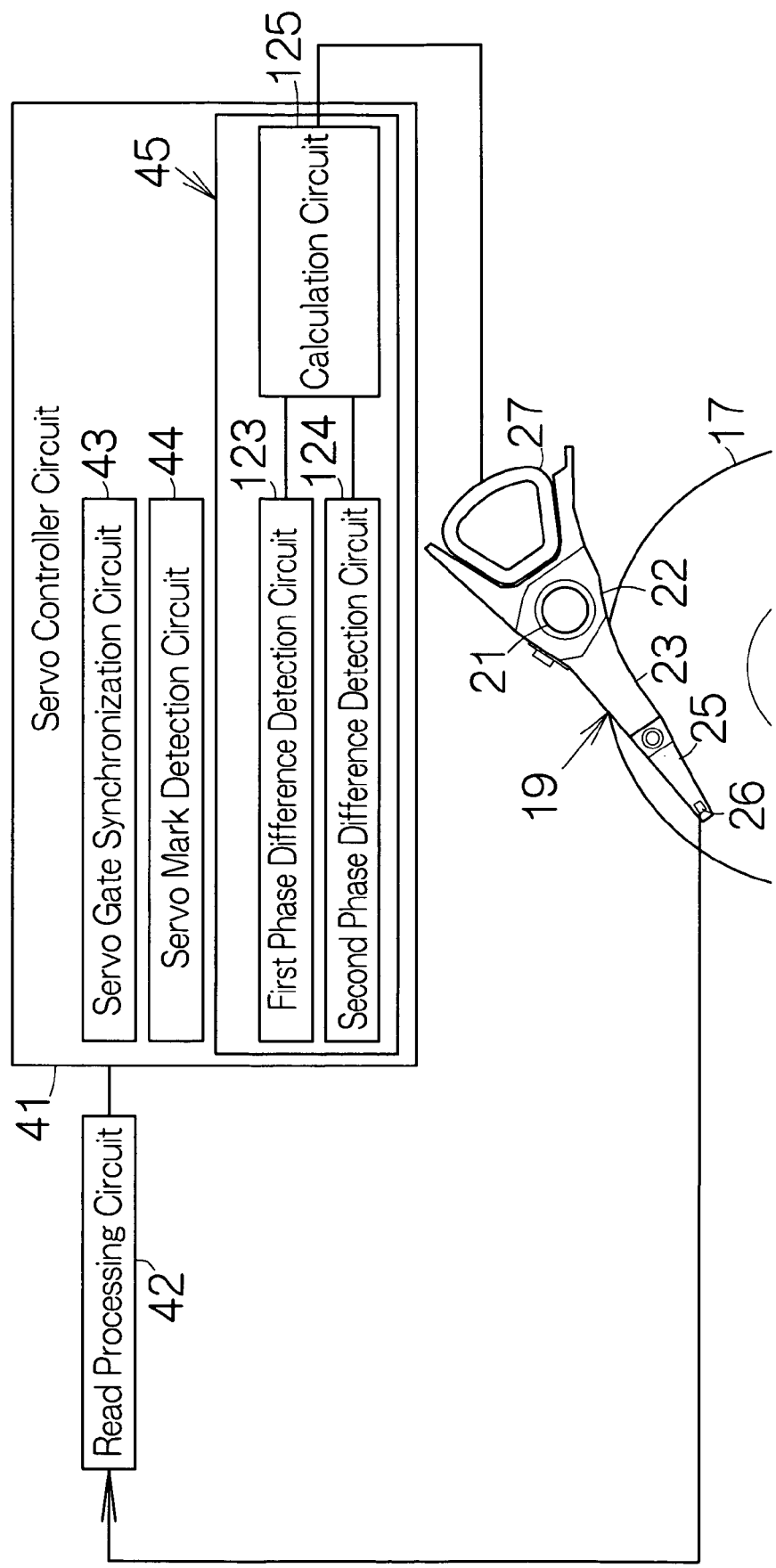
FIG. 19 is a block diagram schematically illustrating the structure of a servo controller circuit incorporated within a HDD of the fourth embodiment.

As shown in FIG. 19, the tracking servo processing circuit 45 includes first and second phase difference detection circuit 123, 124 in the servo controller circuit 41 of the HDD. The first phase difference detection circuit 123 is designed to detect a phase difference based on the reproduction signal derived from the first positional information region 116. The first phase difference detection circuit 123 detects the maximum peak that first appears in the reproduction signal after the tracking servo gate signal has taken the value "1", for example. This maximum peak is identified as the benchmark of the synchronization. The phase difference of the reproduction signal derived from the first positional information region 116 is measured based on the phase of the maximum peaks. The first phase difference detection circuit 123 processes the reproduction signal in a specific limited period so as to achieve the measurement. Likewise, the second phase difference detection circuit 124 is designed to detect a phase difference based on the reproduction signal derived from the second positional information region 121. The second phase difference detection circuit 124 detects the maximum peak that first appears in the reproduction signal after the tracking servo gate signal has taken the value "1". This maximum peak is identified as the benchmark of the synchronization. The phase difference of the reproduction signal derived from the second positional information region 121 is measured based on the phase of the maximum peaks. The second phase difference detection circuit 124 processes the reproduction signal in a specific limited period so as to achieve the measurement.

A calculation circuit 125 is connected to the first and second phase difference detection circuits 123, 124. The calculation circuit 125 is designed to calculate a difference between the phase difference detected at the first phase difference detection circuit 123 and the phase difference detected at the second phase difference detection circuit 124. The calculated difference serves to determine positional information. The positional information is utilized to generate the control signal for the power source 27 of the head actuator 19.

Now, assume that the read element of the read/write electromagnetic transducer reproduces the magnetic information of the servo sector regions 28 on the rotating magnetic recording disk 17c. When the value "1" is identified in the tracking servo gate signal in the aforementioned manner, the first and second phase difference detection circuits 123, 124 start detecting the phase difference. The first and second phase difference detection circuits 123, 124 individually detect the maximum peak that first appears in the reproduction signal after the tracking servo gate signal has taken the value "1". The first and second phase difference detection circuits 123, 124 determine the period of the maximum peaks based on the detected maximum peaks. The period of the maximum peaks can be identified based on the reproduction signal derived from the preamble region 111, for example. The first and second phase difference detection circuits 123, 124 is simultaneously allowed to set the aforementioned specific limited periods based on the detected first maximum peaks. As is apparent from FIG. 18, the specific limited periods serve to prohibit the processing of the reproduction signal over areas closer to the upstream and downstream ends within the first and second positional information regions 116, 121, for example.

The first phase difference detection circuit 123 detects the phase difference of the maximum peaks based on the reproduction signal derived from the first positional information region 116 within the aforementioned specific limited period. As is apparent from FIG. 18, in the case where the second recording track 38*b* is selected within the recording track set 38, for example, the first phase difference detection circuit 123 detects the phase difference of "+30" degrees based on the first positional information region 116. Likewise, the second phase difference detection circuit 124 detects the phase difference of the maximum peaks based on the reproduction signal derived from the second positional information region 121 within the aforementioned specific limited period. As is apparent from FIG. 18, in the case where the second recording track 38*b* is selected within the recording track set 38, for example, the second phase difference detection circuit 124 detects the phase difference of "−45" degrees based on the second positional information region 121.

The calculation circuit 125 thereafter calculates the difference between the detected phase differences "+30" and "−45". Here, the difference "+75" degrees can be obtained. The obtained difference is utilized to determine positional information. The control signal is generated based on the determined positional information. When the generated control signal is supplied to the power source 27 of the head actuator 19, the read/write electromagnetic transducer on the flying head slider 26 is positioned right above the recording track 38*b* at a higher accuracy.

The HDD suffers from an additional weak magnetic pole based on the second weak magnetized stripes 85 in the servo mark regions 112. As described above, the weak magnetic pole forms a large peak in the reproduction signal. The large peak of the type is usually taken for the maximum peak that first appears in the reproduction signal after the tracking servo gate signal has taken the value "1". The benchmark of the synchronization is thus shifted. However, the first phase difference detection circuit 123 detects the phase difference of "+10" degrees based on the first positional information region 116 in the case where the second recording track 38*b* is selected within the recording track set 38 in the same manner as described above. At the same time, the second phase difference detection circuit 124 detects the phase difference of "−65" degrees based on the second positional information region 121. The calculation circuit 125 obtains the difference of "+75" degrees. Even if the large peak is taken for the first maximum peak, the calculation circuit 125 accurately generates the positional information. In this manner, an accurate tracking servo control can be achieved irrespective of the presence of an additional weak magnetic pole. The read/write electromagnetic transducer on the flying head slider 26 is allowed to reliably keep following the recording tracks on the magnetic recording disk 17*c*.

Figure 20:
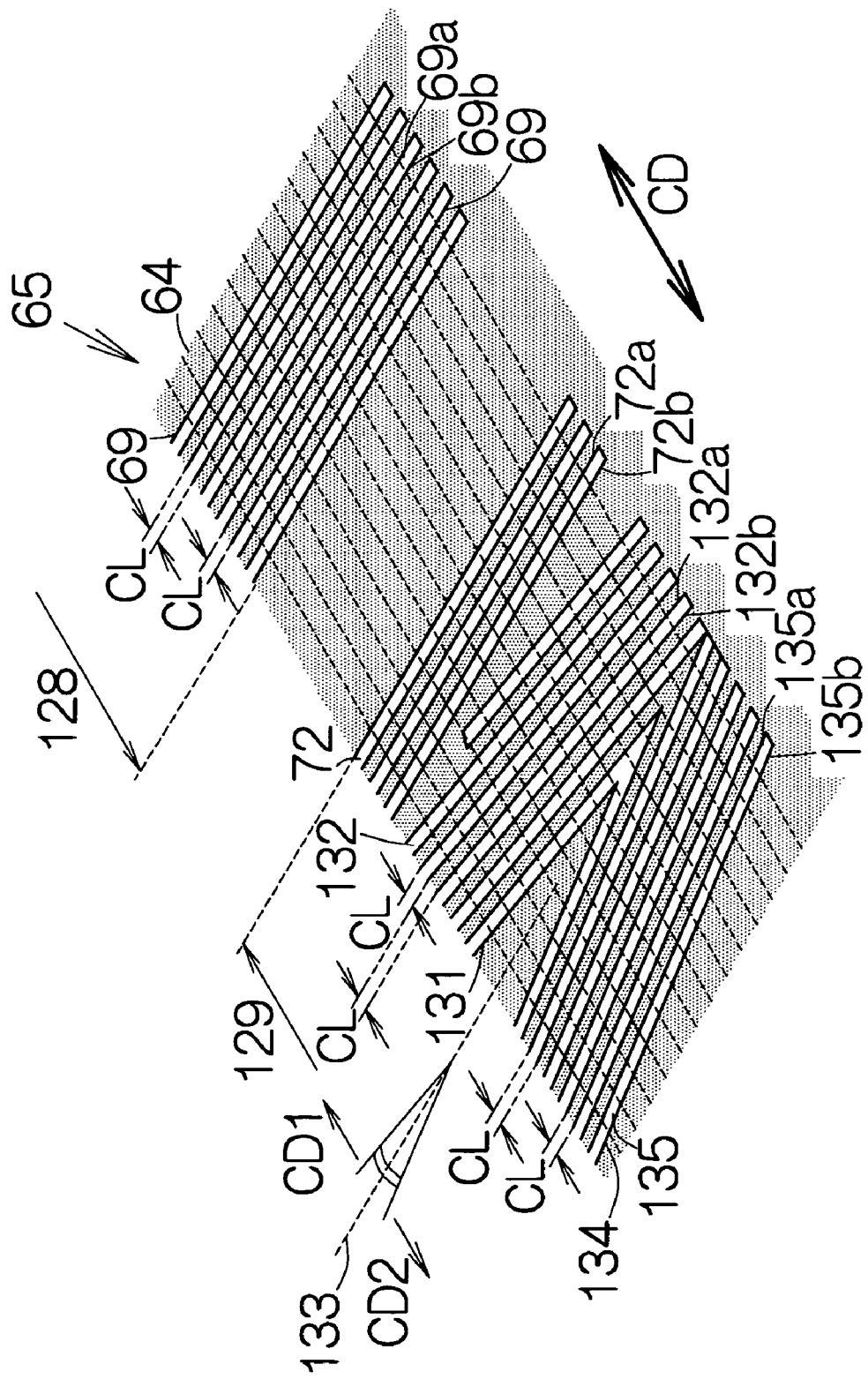
FIG. 20 is an enlarged partial perspective view schematically illustrating the structure of a master medium.

The aforementioned magnetic transfer apparatus 51 can be utilized to make the magnetic recording disk 17*c*. In this case, a preamble reflection region 128 and a servo data reflection region 129 are formed on the master medium 89 within the magnetic material distribution region 65, as shown in FIG. 20. A predetermined clearance is set between the preamble reflection region 128 and the servo data reflection region 129 in the circumferential direction CD. The clearance reflects the extent of the servo mark region 112 on the magnetic recording disk 17*c*. The preamble reflection region 128 may take a structure identical to that of the aforementioned preamble reflection region 66. Like reference numerals are attached to structure and components equivalent to those of the first to third embodiments.

Stripes of third magnetic pieces 72 are embedded in the servo data reflection region 129 at a position closest to the preamble reflection region 128 in the same manner as described above. Stripes of first inclined magnetic pieces 132 are embedded downstream of the third magnetic pieces 72. The first inclined magnetic pieces 132 extend along first inclined lines 131. The first inclined lines 131 inclines in the first circumferential direction CD1 by the inclination angle β from a datum radial line 133. The uniform space CL is set between the upstream contour 132*a* and the downstream contour 132*b* in the circumferential direction CD of the substrate in the individual first inclined magnetic piece 132. In addition, the uniform space CL is likewise set between the adjacent first inclined magnetic pieces 132. The upstream and downstream contours 132*a*, 132*b* of the first inclined magnetic pieces 132 are thus alternately arranged in the circumferential direction at positions equally spaced by the uniform spaces CL.

Stripes of second inclined magnetic pieces 135 are embedded downstream of the first magnetic pieces 132. The second inclined magnetic pieces 135 extend along second inclined lines 134. The second inclined lines 134 inclines in the second circumferential direction CD2, opposite to the first circumferential direction CD1, by the inclination angle y from the datum radial line 133. The uniform space CL is set between the upstream contour 135*a* and the downstream contour 135*b* in the circumferential direction CD of the substrate in the individual second inclined magnetic piece 135. In addition, the uniform space CL is likewise set between the adjacent second inclined magnetic pieces 135. The upstream and downstream contours 135*a*, 135*b* of the second inclined magnetic pieces 135 are thus alternately arranged in the circumferential direction at positions equally spaced by the uniform spaces CL.

Figure 21:
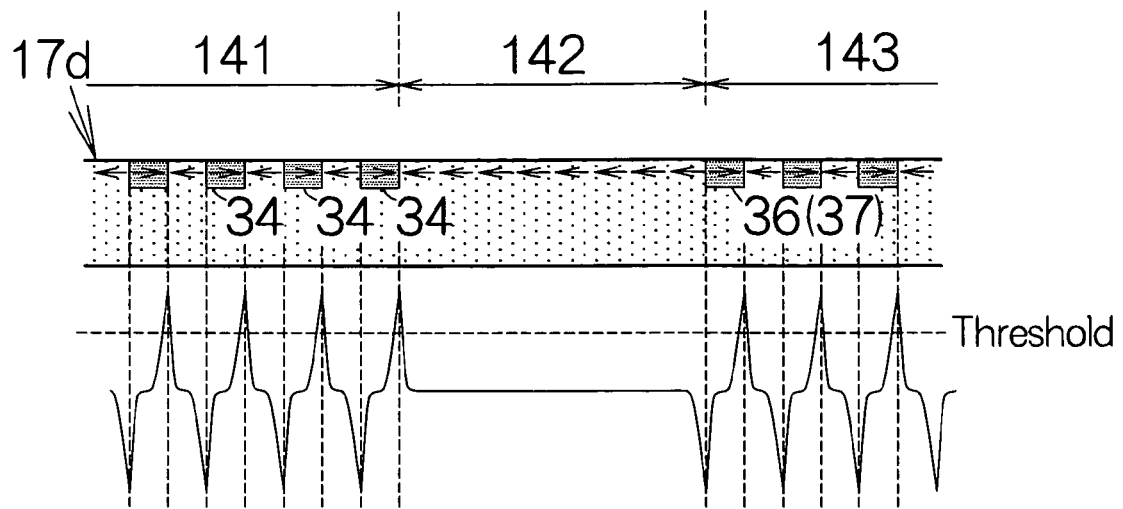
FIG. 21 illustrates the correlation between the magnetic poles in a servo sector region and the waveform of the reproduction signal for a magnetic recording disk incorporated within a HDD according to a fifth embodiment of the present invention.

A HDD according to a fifth embodiment of the present invention includes a magnetic recording disk 17*d*, in place of the magnetic recording disk 17, within the enclosure 12. As shown in FIG. 21, a preamble region 141, a servo mark region 142 and a servo data region 143 are, in this sequence from the upstream end, formed in the individual servo sector region 28 on the magnetic recording disk 17*d*, for example. The preamble and servo data regions 141, 143 have structures identical to that of the aforementioned preamble and servo data regions 31, 33. A uniform magnetization is established over the servo mark region 142. Specifically, no first and second weak magnetized stripes 84, 85 are formed within the servo mark region 142. No magnetic poles are thus formed within the servo mark region 142. Otherwise, the HDD of the fifth embodiment has the structure identical to the HDD 11 of the first embodiment. Like reference numerals are attached to structure or components equivalent to those of the first to fourth embodiments.

Figure 22:
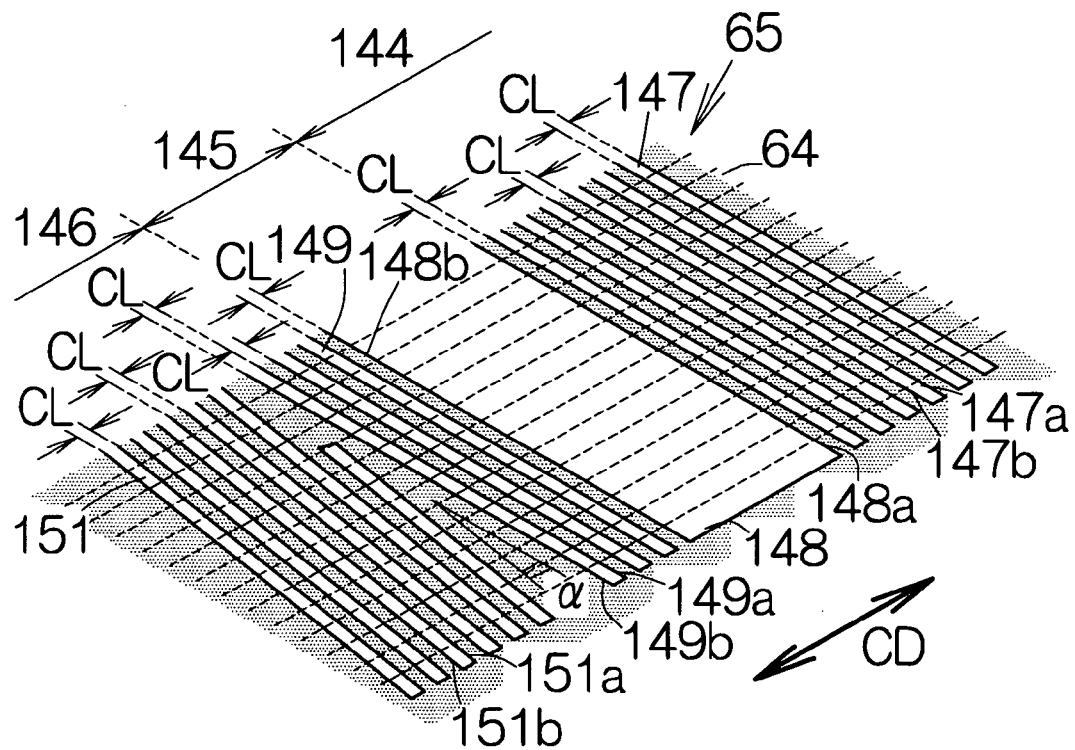
FIG. 22 is an enlarged partial perspective view schematically illustrating the structure of a master medium.

The aforementioned magnetic transfer apparatus 51 can be utilized to make the magnetic recording disk 17*d*. In this case, a preamble reflection region 144, a servo mark reflection region 145 and a servo data reflection region 146 are, in this sequence from the upstream end, formed on the master medium 89 within the magnetic material distribution region 65, as shown in FIG. 22. Stripes of first magnetic pieces 147 are embedded in the substrate 89 in the preamble reflection region 144, for example. The first magnetic pieces 147 extend on radii of the substrate 89. The uniform space CL is set between the upstream contour 147*a* and the downstream contour 147*b* in the circumferential direction CD of the substrate in the individual first magnetic piece 147. In addition, the uniform space CL is likewise set between the adjacent first magnetic pieces 147. The upstream and downstream contours 147*a*, 147*b* of the first magnetic pieces 147 are thus alternately arranged in the circumferential direction CD at positions equally spaced by the uniform spaces CL.

A stripe of second magnetic piece 148 is embedded in the substrate 89 in the servo mark reflection region 145. The second magnetic piece 148 extends on a radius of the substrate 89. The second magnetic piece 148 is defined by the upstream and downstream contours 148a, 184b extending on radii of the substrate 89. The upstream contour 148a is spaced from the first magnetic piece 147 in the circumferential direction CD of the substrate by the aforementioned uniform space CL. A space is set between the upstream and downstream contours 148a, 148b equal to N times as large as the uniform space CL. N is a natural number.

Stripes of third magnetic pieces 149 are embedded in the substrate 89 in the servo data reflection region 146, for example. The third magnetic pieces 149 extend on radii of the substrate 89. The third magnetic piece 149 closest to the servo mark reflection region 145 is spaced from the second magnetic piece 148 in the circumferential direction CD of the substrate by the aforementioned uniform space CL. The uniform space CL is set between the upstream contour 149a and the downstream contour 149b in the circumferential direction CD of the substrate in the individual third magnetic piece 149. In addition, the uniform space CL is likewise set between the adjacent third magnetic pieces 149. The upstream and downstream contours 149a, 149b of the third magnetic pieces 149 are thus alternately arranged in the circumferential direction at positions equally spaced by the uniform spaces CL.

Stripes of fourth magnetic pieces 151 are likewise embedded in the substrate 89 in the servo data reflection region 146. The fourth magnetic pieces 151 extend along inclined lines intersecting a radius by a predetermined inclination angle α. The fourth magnetic pieces 151 are located downstream of a group of the third magnetic pieces 149. The uniform space CL is set between the upstream contour 151a and the downstream contour 151b in the circumferential direction CD of the substrate in the individual fourth magnetic piece 151. In addition, the uniform space CL is likewise set between the adjacent fourth magnetic pieces 151. The upstream and downstream contours 151a, 151b of the fourth magnetic pieces 151 are thus alternately arranged in the circumferential direction CD at positions equally spaced by the uniform spaces CL.

Figure 23:
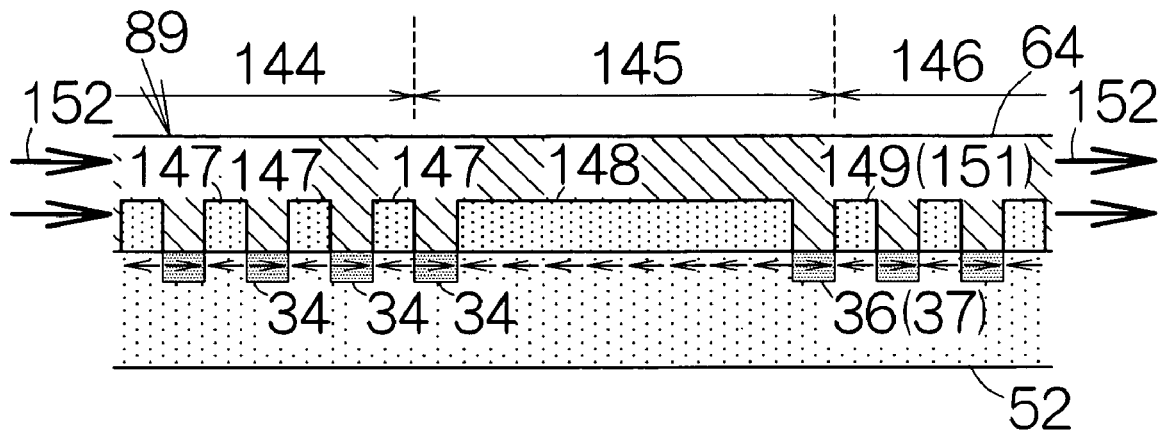
FIG. 23 is an enlarged partial sectional view of the master and slave media for schematically illustrating the process of forming a servo pattern.

When the master medium 89 is superposed on the upper surface of the slave medium 52 in the magnetic transfer apparatus 51, the magnetic pieces 147, 148, 149, 151 on the master medium 89 are allowed to contact the surface of the slave medium 52. A predetermined magnetic field 152 is then applied to the master medium 89, as shown in FIG. 23. The magnetic flux penetrates through the magnetic pieces 147, 148, 149, 151. The magnetic flux runs around the substrate between the adjacent magnetic pieces 147, 148, 149, 151. The magnetic flux thus induces leakage of the magnetic field from the master medium 89. The leaked magnetic field acts on the surface of the slave medium 52. The magnetization is accordingly established on the surface of the slave medium 52 in the aforementioned first circumferential direction CR. The leaked magnetic field between the first and second magnetic pieces 147, 148 serves to establish the last one of the synchronization magnetized stripes 34 in the preamble region 141 on the slave medium 52. The leaked magnetic field between the second and third magnetic pieces 148, 149 likewise serves to establish the first one of the reference magnetized stripes 36 in the servo data region 143 on the slave medium 52. A smaller space can be set between any adjacent pairs of the magnetic pieces 147, 148, 149, 151 in the master medium 89, so that the leaked magnetic field is allowed to have a sufficient intensity or strength. Magnetization of a sufficient intensity can reliably be established on the slave medium 52. This serves to eliminate establishment of an additional weak magnetic pole on the slave medium 52.

Figure 24:
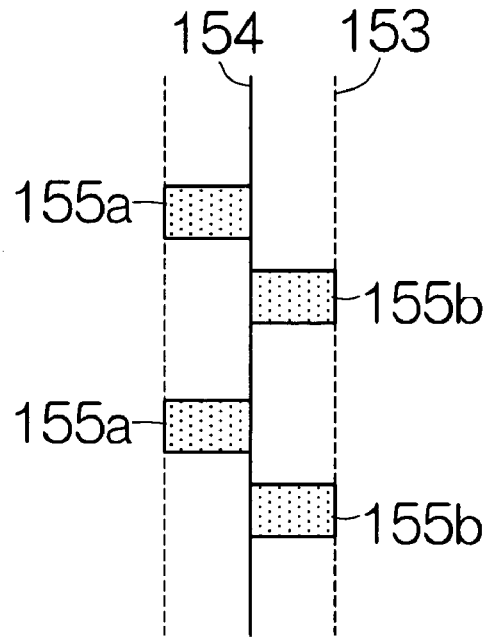
FIG. 24 is an enlarged partial plan view of a magnetic recording disk for schematically illustrating the structure of a servo data region suitable for a tracking servo control based on the magnitude of the reproduction signal.

A tracking servo control may be based on the magnitude of the reproduction signal, in place of the phase of the reproduction signal as mentioned above, in the HDD according to the first, second, third and fifth embodiments. In this case, the magnetized pieces 155a, 155b of an identical shape may be assigned to the opposite sides of a longitudinal centerline 154 of a recording track 153 in the servo data region 33, 83, 103, 143 on the magnetic recording disk 17, 17a, 17b, 17d, as shown in FIG. 24, for example. The magnetized pieces 155a, 155b are provided in place of the aforementioned phase determination magnetized stripes 37.

What is claimed is:

1. A master medium for magnetic transfer, comprising:
   first magnetic pieces extending in a radial direction at positions equally spaced in a circumferential direction for establishing a preamble region over a servo region on a magnetic recording medium;
   a second magnetic piece located at positions spaced from the first magnetic pieces in the circumferential direction, said second magnetic piece being arranged in accordance with a predetermined pattern for establishing a reference magnetized region in a servo data region over the servo region; and
   a third magnetic piece located between the first magnetic pieces and the second magnetic piece in the circumferential direction, said third magnetic piece being arranged in accordance with a pattern different from the predetermined pattern for establishing a servo mark region between the preamble region and the reference magnetized region over the servo region.

2. A magnetic transfer apparatus incorporating the master medium according claim 1.

3. A master medium for magnetic transfer, comprising:
   first magnetic pieces extending in a radial direction at positions equally spaced in a circumferential direction by a uniform space;
   a second magnetic piece extending in the radial direction at a position spaced from the first magnetic pieces in the circumferential direction by the uniform space, said second magnetic piece having a width equal to N times as large as the uniform space, in which N is a natural number; and
   at least a third magnetic piece extending in the radial direction at a position spaced from the second magnetic piece in the circumferential direction by the uniform space.

4. The master medium according to claim 3, further comprising a fourth magnetic piece located adjacent the third magnetic piece in the circumferential direction, said fourth magnetic piece being contoured with a straight line inclined from a radius.

5. A magnetic transfer apparatus incorporating the master medium according to claim 3.

* * * * *